United States Patent
Anandarajah

(10) Patent No.: US 9,601,113 B2
(45) Date of Patent: Mar. 21, 2017

(54) SYSTEM, DEVICE AND METHOD FOR PROCESSING INTERLACED MULTIMODAL USER INPUT

(71) Applicant: XTREME INTERACTIONS INC., Toronto (JP)

(72) Inventor: Joe Anandarajah, Toronto (CA)

(73) Assignee: XTREME INTERACTIONS INC., Toronto (CA)

(*) Notice: Subject to any disclaimer, the term of this patent is extended or adjusted under 35 U.S.C. 154(b) by 150 days.

(21) Appl. No.: 14/241,399

(22) PCT Filed: May 15, 2013

(86) PCT No.: PCT/CA2013/050375
§ 371 (c)(1),
(2) Date: Feb. 26, 2014

(87) PCT Pub. No.: WO2013/170383
PCT Pub. Date: Nov. 21, 2013

(65) Prior Publication Data
US 2015/0019227 A1    Jan. 15, 2015

Related U.S. Application Data

(60) Provisional application No. 61/647,890, filed on May 16, 2012, provisional application No. 61/766,416, filed on Feb. 19, 2013.

(51) Int. Cl.
*G10L 15/22* (2006.01)
*G10L 15/18* (2013.01)
(Continued)

(52) U.S. Cl.
CPC .............. *G10L 15/18* (2013.01); *G06F 3/038* (2013.01); *G06F 3/0481* (2013.01);
(Continued)

(58) Field of Classification Search
CPC ......... G10L 15/18; G10L 17/22; G10L 15/22; G10L 15/19; G06F 3/04883;
(Continued)

(56) References Cited

U.S. PATENT DOCUMENTS 5,884,249 A    3/1999 Namba et al.
6,570,555 B1    5/2003 Prevost et al.
(Continued)

OTHER PUBLICATIONS

Pires, Carlos et al., "On the Benefits of Speech and Touch Interaction with Communication Services for Mobility Impaired Users." In AAL, pp. 60-73. 2011.
(Continued)

*Primary Examiner* — Marcellus Augustin
(74) *Attorney, Agent, or Firm* — Westerman, Hattori, Daniels & Adrian, LLP

(57) ABSTRACT

A device, method and system are provided for interpreting and executing operations based on multimodal input received at a computing device. The multimodal input can include one or more verbal and non-verbal inputs, such as a combination of speech and gesture inputs received substantially concurrently via suitable user interface means provided on the computing device. One or more target objects is identified from the non-verbal input, and text is recognized from the verbal input. An interaction object is generated using the recognized text and identified target objects, and thus comprises a natural language expression with embedded target objects. The interaction object is then processed to identify one or more operations to be executed.

27 Claims, 23 Drawing Sheets

(51) Int. Cl.
| | |
|---|---|
| *G06F 3/16* | (2006.01) |
| *G06F 3/038* | (2013.01) |
| *G06F 3/0481* | (2013.01) |
| *G06F 3/0484* | (2013.01) |
| *G06F 3/0488* | (2013.01) |
| *G10L 17/22* | (2013.01) |
| *G10L 15/19* | (2013.01) |

(52) U.S. Cl.
CPC ...... *G06F 3/04845* (2013.01); *G06F 3/04883* (2013.01); *G06F 3/167* (2013.01); *G10L 15/22* (2013.01); *G10L 17/22* (2013.01); *G06F 2203/0381* (2013.01); *G06F 2203/04806* (2013.01); *G10L 15/19* (2013.01)

(58) Field of Classification Search
CPC .... G06F 3/04845; G06F 3/0481; G06F 3/038; G06F 3/167; G06F 2203/04806; G06F 2203/0381
USPC ... 704/216–218, 237, 257, 263, 9, 214, 235, 704/270.1, 275
See application file for complete search history.

(56) References Cited

U.S. PATENT DOCUMENTS

| | | | |
|---|---|---|---|
| 6,570,588 B1 | 5/2003 | Ando et al. | |
| 6,785,649 B1* | 8/2004 | Hoory | G10L 13/08 704/235 |
| 6,925,307 B1 | 8/2005 | Mamdani et al. | |
| 7,684,985 B2 | 3/2010 | Dominach et al. | |
| 8,150,872 B2 | 4/2012 | Bernard | |
| 8,213,995 B2 | 7/2012 | Oh et al. | |
| 8,289,283 B2 | 10/2012 | Kida et al. | |
| 8,294,683 B2 | 10/2012 | Ranford et al. | |
| 8,402,533 B2 | 3/2013 | LeBeau et al. | |
| 2006/0164382 A1 | 7/2006 | Kulas et al. | |
| 2009/0225041 A1 | 9/2009 | Kida et al. | |
| 2010/0250248 A1 | 9/2010 | Willins | |
| 2010/0312547 A1 | 12/2010 | Van Os et al. | |
| 2011/0115702 A1* | 5/2011 | Seaberg | G06F 3/017 345/156 |
| 2011/0201387 A1 | 8/2011 | Paek et al. | |
| 2012/0016678 A1* | 1/2012 | Gruber | G06F 17/3087 704/275 |
| 2012/0128538 A1 | 5/2012 | Miller et al. | |
| 2012/0226977 A1 | 9/2012 | Lengeling et al. | |
| 2012/0254143 A1 | 10/2012 | Varma et al. | |
| 2012/0280915 A1 | 11/2012 | Kyllonen et al. | |
| 2012/0290987 A1 | 11/2012 | Gupta | |
| 2013/0018659 A1 | 1/2013 | Chi | |
| 2013/0046544 A1 | 2/2013 | Kay et al. | |
| 2013/0188887 A1* | 7/2013 | Chan | G06K 9/20 382/312 |

OTHER PUBLICATIONS

Maybury, Mark T. "Language Technology—a Survey of the State of the Art Language Resources-Multimodal Language Resources." MITRE Corporation, pp. 1-24. 2002.

Sim, Khe Chai. "Probabilistic integration of partial lexical information for noise robust haptic voice recognition." In Proceedings of the 50th Annual Meeting of the Association for Computational Linguistics: Long Papers—vol. 1, pp. 31-39. Association for Computational Linguistics, 2012.

Tse, Edward, et al., "Enabling interaction with single user applications through speech and gestures on a multi-user tabletop." In Proceedings of the working conference on Advanced visual interfaces, pp. 336-343. ACM, 2006.

Bolt, Richard A. "Put-that-there": Voice and gesture at the graphics interface. vol. 14, No. 3. pp. 262-270. ACM, 1980.

International Search Report dated Aug. 7, 2013, issued in corresponding application No. PCT/CA2013/050375.

Written Opinion of the International Searching Authority dated Aug. 7, 2013, issued in corresponding application No. PCT/CA2013/050375.

* cited by examiner

SYSTEM, DEVICE AND METHOD FOR PROCESSING INTERLACED MULTIMODAL USER INPUT

CROSS-REFERENCE TO RELATED APPLICATIONS

This application claims priority to U.S. Provisional Application No. 61/647,890, filed 16 May 2012, and to U.S. Provisional Application No. 61/766,416, filed 19 Feb. 2013, the entireties of which are incorporated herein by reference.

TECHNICAL FIELD

The present disclosure relates to interpretation and execution of interlaced multimodal user input on a computing device.

TECHNICAL BACKGROUND

Currently, the preeminent user interface mechanism for control over user computing devices (such as smartphones, tablets, laptops and desktop systems) is the graphical user interface, which is often deployed together with a pointing-based or touch-based user interface. While the graphical user interface offers a convenient and understandable interface with the computing device's underlying functions, thanks to its desktop metaphor, the fact remains that the human-machine interface is distinctly different from natural interpersonal communication. Even the use of touch-based control requires some amount of user training so that the user learns how to correlate touches and gestures with the commands controlling the device.

Interpersonal communication is largely speech and gesture-based, which speech and gesture or context being received concurrently by the listener. To date, there has been limited research on concurrent speech and gesture processing, and generally, the approach has been focused on receiving concurrent input, but then combining the speech and gesture only after the each of the speech and gesture input had been separately processed.

BRIEF DESCRIPTION OF THE DRAWINGS

In drawings which illustrate by way of example only embodiments of the present disclosure, in which like reference numerals describe similar items throughout the various figures.

DETAILED DESCRIPTION OF THE INVENTION

Figure 1:
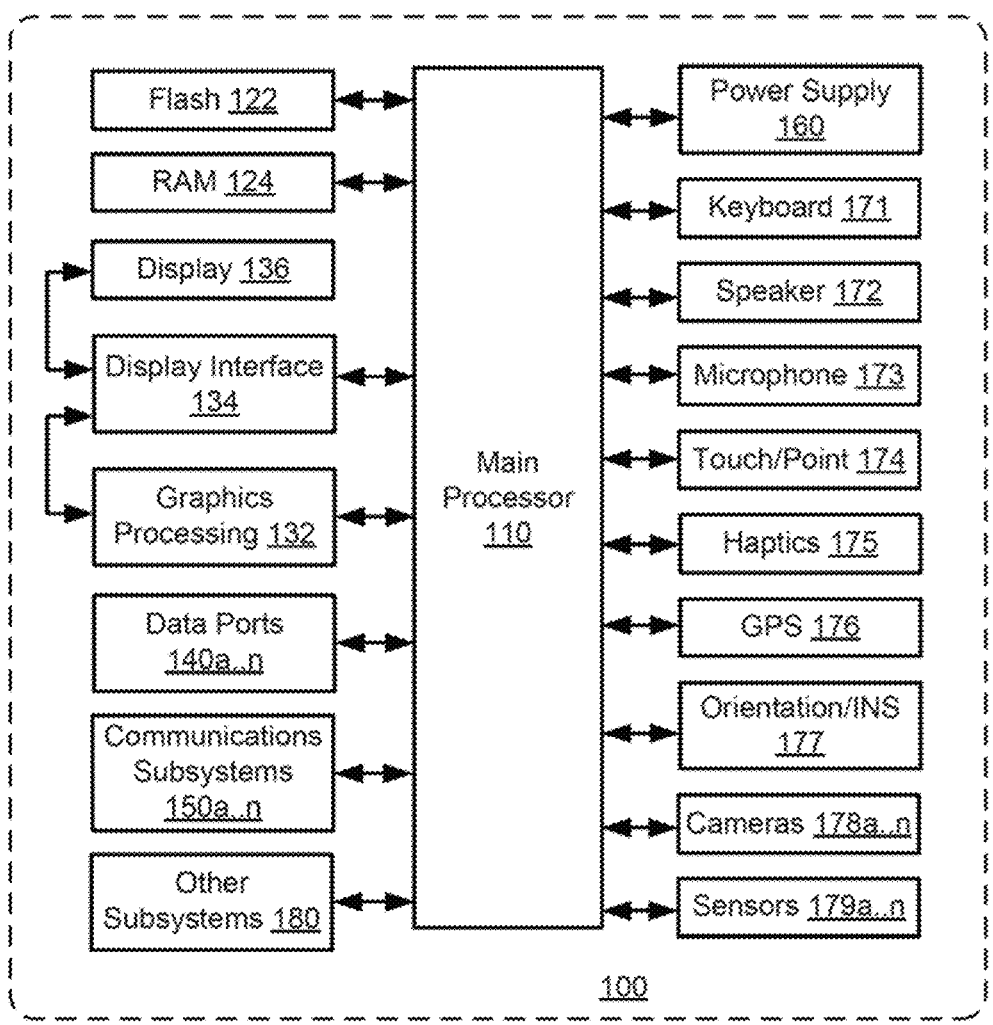
FIG. 1 is a block diagram illustrating possible components of an example computing device 100 for implementing the embodiments and examples described herein.

The embodiments described herein provide a system, method and device that facilitate user control of a computing device, as well as services and physical devices accessible by the computing device, by receiving and processing concurrently received multimodal input. Both verbal and non-verbal input can be concurrently received from the user. The input identifies one or more target objects, whether software, physical, or service-related, and further identifies, using natural language, operations to be performed on or with the identified target objects. Non-verbal input is associated with nouns and verbs based on the type of non-verbal input performed. The verbal and non-verbal input is processed in parallel to create an interaction object that is subsequently interpreted and executed. Further, the non-verbal input can be processed in advance of completion of the speech input or completion of speech recognition. Synonyms and phonemes associated with the non-verbal input can accordingly be identified prior to completion of speech recognition, and can be used to help improve the accuracy or speed of speech recognition. This results in less latency in the user experience and faster information throughput. The features described herein overall improve human-machine interaction by permitting the user to use verbal (particularly) speech input in a manner closer to natural spoken language, which tends to imply irregular and often incomplete sentences that rely on gestural information or context to supply missing verbal information.

These embodiments will be described and illustrated primarily in relation to computing devices, which can include tablet computers, smartphones, or any other suitable computing device provided with sufficient user interface mechanisms as will be understood by those skilled in the art from the following description. It will be appreciated by those skilled in the art, however, that this description is not intended to limit the scope of the described embodiments to implementation on tablets or smartphones in particular. For example, the methods and systems described herein may be applied to any appropriate communication device or data processing device adapted with suitable user interface mechanisms, regardless of the primary purpose or function of the device, such as productivity or entertainment. Therefore, the examples described herein may be implemented in whole or in part on electronic devices including without limitation cellular phones, smartphones, wireless organizers, personal digital assistants, wearable computers, desktop computers, terminals, laptops, tablets, e-book readers, handheld wireless communication devices, notebook computers, gaming devices, tabletop displays, Internet-connected televisions, set-top boxes, digital picture frames, digital cameras, in-vehicle entertainment systems, entertainment devices such as MP3 or video players, and the like. In the primary examples described herein, the computing device includes an integrated touchscreen display; however, it will be readily understood by those skilled in the art that in some variants of the embodiments described herein, a touchscreen display is not necessary. In some cases, the electronic device may be configured to output data to be painted to an external display unit such as an external monitor or panel, tablet, television screen, projector, or virtual retinal display (via a data port or transmitter, such as a Bluetooth® transceiver, USB port, HDMI port, DVI port, and the like). For such devices, references herein to a "touchscreen", "display," "display screen" or "display interface", or combinations thereof, are intended to be inclusive of integrated and external display units as appropriate.

FIG. 1 is a block diagram of an example of a computing device 100 that may be used with the embodiments described herein. It should be understood that the components described in FIG. 1 are optional and that a computing device used with various embodiments described herein may include or omit components described in relation to FIG. 1; and further that, for ease of exposition, FIG. 1 omits other components of the device that would be included for functions not explicitly detailed herein.

The computing device 100 in this example includes at least a main processor 110 (e.g., a microprocessor) that controls the device's overall operation. The device 100 in some examples may include multiple processors, which may be configured for specialized operations; an example is the graphics processing unit 132 which may be included specifically for graphics processing.

The device includes one or more memory devices in communication with the main processor no, such as flash memory 122 and Random Access Memory (RAM) 124 for storing operating system code, application code, and associated data. Additional memory or storage modules, not shown in FIG. 1, may also be provided for storing data, which can contain flash memory modules as well. Examples include non-volatile memory cards such in the microSD and miniSD formats defined by the SD Association, San Ramon, Calif. Such storage modules may communicate with the mobile device 100 using a fixed or wireless connection.

The main processor 110 also interacts with additional subsystems (if present), the general configuration and implementation of which will be known to those skilled in the art, such as the aforementioned graphics processing unit 132 and display interface 134, which in turn outputs data for display to the display 136. Other possible subsystems include one or more data ports 140a-n; one or more communication subsystems 150a-n; a power supply subsystem 160, which can include a battery and battery interface, and/or power management features; and other user and data interface systems components detailed below. Alternatively or additionally, the computing device 100 may be provided with an external power supply (e.g., mains power, using a suitable adapter as necessary).

The main processor 110 and the various subsystems can be used to implement and execute special purpose or general purpose functions and software components, such as applications. Common applications provided for such computing devices 100 can include messaging applications using one or more different formats (e.g., email, instant messaging, Short Message Service, and the like); social networking applications; web browsers and other content/feed reader applications; personal information management applications such as calendars, tasks, and reminder applications; media applications for playback or presentation of audio, image, and/or video files; file managers; virtual machines for providing discrete runtime environments for other code executing on the device 100; direct or peer-to-peer file sharing or data synchronization applications for managing file transfers between devices (for example, using the various communication subsystems 150a . . . n); and the like. Executable code for these applications may be stored in flash memory 122. For those applications that have a need to store data at the device 100, the application may store data in the device's file system. A dedicated data store or data structure may be defined for each application. This data store may be, for example, a message store for each messaging application. Permission to access the data store may be limited to the associated application.

If configured for voice and/or data communication functions, one or more communication subsystems 150a-n can be included. Data received via one of these subsystems can be decoded, decompressed and/or decrypted as necessary using techniques and components known to persons of skill in the art. A wireless communication subsystem typically includes a receiver, transmitter, and associated components such as one or more embedded or internal antenna elements, local oscillators, and a digital signal processor in communication with the transmitter and receiver. The particular design of the communication subsystem 150a-n is dependent upon the wireless communication network (e.g. a cellular communication network) with which the subsystem is intended to operate. For instance, data may be communicated to and received by the computing device 100 using a wireless communication subsystem configured in accordance with one or more existing wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. Other communication subsystems that can be provided in or for the computing device 100 include a wireless LAN (WLAN) communication subsystem or a short-range and/or near-field (NFC) communications subsystem. The WLAN communication subsystem may operate in accordance with a known network protocol such as one or more of the 802.11™ family of standards developed or maintained by IEEE. These various communications subsystems provide for wireless communication between the computing device 100 and different systems or devices over varying distances without the use of the wireless communication network mentioned above.

Other types of short-range communications systems will be known to those skilled in the art, and may be incorporated in the device 100 as one of the communication subsystems 150a-n. It should be understood that integration of any of the communication subsystems 150a-n within the device chassis itself is optional. Further, one or more of the communication subsystems may be provided by a dongle or other peripheral device (not shown) connected to the computing device 100, either wirelessly or by a fixed connection (for example, by a USB port) to provide the computing device 100 with wireless communication capabilities. If provided on board the computing device 100, the communication subsystems 150a-n may be separate from, or integrated with, each other.

Possible network topologies for use with the device 100, which can be accessible using one or more of the communication subsystems 150a-n, will be known to those skilled in the art. As only one example, a host system may be provided, which can be an own-premises local area network (LAN), or wide area network in communication with LANs, with local computing resources such as one or more servers, data repositories and client devices such as terminals. The host system may comprise those components necessary to provide services to users over the LAN and also over a public or private network, such as the Internet, at their respective devices 100. The services can include but are not limited to messaging, directory services, collaborative applications, calendaring applications, search engines and file servers.

A number of other input/output interface subsystems may be provided on the computing device 100 as well. Examples include a keyboard 171, speaker 172, microphone 173, touch or pointing input device 174 (e.g., a touchpad, touchscreen, trackball, active bezel surrounding the display 136, and the like), haptics module 175 (e.g., a driver and a vibratory component, such as a motor), GPS or other location tracking subsystem 176, orientation and/or inertial navigation system (INS) subsystem 177, one or more cameras 178a-n, and other sensor input components 179a-n. In some cases, zero, one or more of each of these various subsystems may be provided, and some subsystem functions may be provided by software, hardware, or a combination of both. The design and implementation of these components will be known to those skilled in the art. For example, a physical keyboard 116 may not be integrated in the computing device 100; instead, text input may be received from the user via a virtual keyboard displayed in a graphical user interface presented on the display 136, using software components executing at the device. The device 100 may include other subsystems 180, as may be known to those skilled in the art. For instance, the computing device 100 may also include one or more proximity sensors which can be used to determine distance of the device 100 from a surface. An example of a proximity sensor is a radiation sensor for detecting reflected radiation, such as infrared light, from a nearby surface. Such a sensor may typically be used in conjunction with voice or video communication functions on the device 100 to determine when the user is present in front of or in close proximity to the display 136. The sensor may or may not be integrated with a camera 178a. Other suitable types of proximity sensors will be known to those skilled in the art. Another example is a light beacon, not shown in FIG. 1, such as a light emitting diode that can be illuminated in patterns and/or colors to convey information to the user (e.g., to indicate that a message has been received).

In some examples, the computing device 100 may be a touchscreen-based device, in which case the display 136 comprises a touchscreen interface that provides both a display visual presentation of data and graphical user interfaces, and an input subsystem for detecting user input via contact on the display 136. A display 136 that is a touchscreen may be the principal user interface provided on the computing device 100, in which case other user input mechanisms such as the keyboard 116 or touch/pointing device 174 may not be present, although in some examples such additional input devices are still provided.

In touchscreen embodiments, the touchscreen interface provided with the display 136 may detect may detect a touch by any suitable contact member on the touch-sensitive surface of the display 136 (references to the "display 136" herein include a touchscreen display, for those computing devices provided with touchscreen interfaces). The configuration of the touchscreen display and any suitable controller or processor for detecting touches will be known to those skilled in the art. As only one example, the touchscreen display may be a capacitive touchscreen display with a capacitive touch-sensitive overlay having multiple layers including, for example, a substrate, a ground shield layer, a barrier layer, one or more capacitive touch sensor layers separated by a substrate or other barrier, and a cover. Optionally, haptic or tactile feedback can be provided by the haptics module 175 in response to detected touches received through the touchscreen display, either through the housing of the device 100, or through the touchscreen itself. The touchscreen sensors may be capable of detecting and supporting single-touch, multi-touch, or both single and multi-touch actions such as tap, double-tap, tap and hold, tap and drag, scroll, press, flick and pinch. A touchscreen enabled to detect only single-touch input is able to accurately identify only one point of contact on the display at a time. A multi-touch touchscreen is able to accurately identify two or more simultaneous contacts on the screen. The touchscreen display detects these single and multi-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the display screen or view presented by the display 136. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen implemented on the device.

The orientation/INS module 177 can include one or more motion or tilt sensors capable of detecting gravity- or motion-induced forces to determine physical conditions of the device such as acceleration and angular velocity, which in turn can be used to determine the orientation or geometric attitude of the computing device 100, or changes in orientation or attitude, in two or three dimensions. The orientation or attitude may be defined in absolute terms (i.e., based on a frame of reference external to the user's position or attitude), or terms relative to the user's position or attitude as may be detected by the computing device 100 or based on default values. Motion sensors that may be provided in the orientation/INS module 177 include an accelerometer for detection of linear motion, and a gyroscope for detection of rotational motion. Accelerometers and gyroscopes suitable for use in handheld computing devices include the BMA150 digital 3-axis accelerometer, available from Bosch Sensortech GmbH, Reutlingen, Germany, and the MPU-3050 triple axis gyroscope available from InvenSense, Sunnyvale, Calif. These components may include integrated processors for processing signals generated by the accelerometer or gyroscope to compute motion data, thereby offloading motion algorithm computation from the main processor 110.

The selection and implementation of suitable motion sensors will be understood by those skilled in the art. The orientation/INS module 177, if suitably equipped, may be used to detect changes in orientation of the device 100 between a landscape and portrait mode (i.e., a rotation of approximately 90 degrees, within a given tolerance range), or changes in orientation of the device in three-dimensional space; data obtained by the module 177 may also be used to detect movement of the device 100 in three-dimensional space, and to perform dead reckoning calculations to determine the position of the device 100 due to such movement.

The various subsystems, and in particular the input/output subsystems 171-179*n* mentioned above, comprise user interface (UI) mechanisms, or components of UI mechanisms that can be implemented on the computing device 100. Generally, UI mechanisms can be implemented as hardware, software, or a combination of both hardware and software, and their implementation is known in the art. As will be well understood by those skilled in the art, graphical user interfaces (GUIs) are displayed in the display 136 via the display interface 134, optional graphics processing unit 132, and corresponding software executed by the main processor no. They are typically used in conjunction with a touch UI or pointing UI. Touch UIs are implemented using a touch sensing mechanism, such as the aforementioned touchscreen interface along with appropriate software used to convert detected touch information to touch events, gestures, or instructions. Pointing UIs are implemented using a pointing device such as a mouse, trackball, and the like, along with software that converts signals from the pointing device to pointer (mouse) events or instructions. A text UI may be considered to be any mechanism or subsystem provided for entry of text characters by the user, such as the keyboard 171, or a virtual keyboard displayed on the display 136 (in a touchscreen device, text is entered via the virtual keyboard by sensing touches on the keys displayed onscreen, and thus makes use of the touch UI). A handwriting UI, in which handwriting or actions by the user analogous to handwriting are captured by the device and processed (e.g., using optical character recognition or other gesture-based recognition that correlates detected gestures or movements with text characters) can be implemented in conjunction with a touch UI, pointing UI, or remote device UI (such as a stylus that the user handles like a writing instrument). A voice or speech UI can be implemented using the microphone 173, together with modules implemented in hardware or software operable to detect speech patterns or other sounds (e.g., an automated speech recognition component), and to decode or correlate detected sounds to user commands. A perceptual (e.g., eye-tracking or facial tracking) UI can be implemented using one or more cameras 178*a-n* and/or a proximity sensor, again with appropriate hardware and/or software modules to analyze received visual data to detect the presence or position of a user's face or eyes, which are used to derive commands or contextual information to control device operations. Face- and object-recognition algorithms for identifying the position of facial features or objects against stored data representations of such features and objects are known in the art. A kinetic UI can be implemented using the device's orientation/INS module 177, or using the GPS subsystem 176 or another locating technology component, and/or a proximity sensor, together with appropriate known software and/or hardware modules to detect the motion or position of the computing device 100, again to derive commands or contextual information to control the device.

Those skilled in the art will appreciate that the components on the computing device 100 may function to receive other types of input. For instance, the cameras 178*a-n* can be used to capture images of bar codes, QR codes, or other machine-readable representations of information; the captured images are then recognized and processed by software and/or hardware modules on the device 100 to convert the image data to information in another form that may be actionable by the device 100 or human-readable. Information may further be provided to the device over one or more of the communication subsystems 150*a-n*; for instance, a NFC communication subsystem can be used to capture information from an NFC-tagged item in the proximity of the computing device 100.

Thus, the foregoing UIs can be considered to include the physical sensors or raw input data collection mechanisms (touchscreens, cameras, and so on) provided on the computing device 100. The data output by these various UIs can then result in the identification of specific instructions or "events" that are then output for receipt by a process executing on the computing device 100, such as an application process or operating system process.

Perceptual, kinetic and touch UIs can each be used to detect "gestural" input by the user. A sequence of contacts detected by the touchscreen display 136, for example, can be converted by the touch UI to a gesture, and then output to a process that interprets the gesture as a "scroll" or "zoom" instruction, or a "touchmove" event. In some cases, as with kinetic or perceptual input, the user's movement or the device's movement through space may constitute input that is processed by the perceptual or kinetic UI and converted to instructions (e.g., tilting the device causes a motion to be detected as a change in computed velocity or acceleration by the orientation/INS component 177 of the kinetic UI; the detected motion is converted to a particular event or instruction, such as an instruction to scroll the content displayed on the display 136, and passed to the appropriate process).

Various components used to enable these various forms of UIs may serve other interface functions beyond the purpose of user or contextual control of the electronic device 100. The microphone 173, for example, is typically used in the course of voice communications on a mobile device, in which case the speech and other sounds picked up by the microphone are simply converted to data for transmission over the wireless network and are not analyzed to detect context or commands.

Generally, in-person, interpersonal communication is often accomplished using interlaced speech (verbal communication) and physical gestures or physical context (non-verbal communication). The non-verbal aspect of communication is frequently used to identify objects, locations, and/or directions, and in fact is often a necessity to make the communication complete. Consider the directive "move this box from here to there", which if uttered in interpersonal communication would typically be accompanied by one or more physical, non-verbal cues to provide context or meaning to the spoken words: if physical proximity of the originator of the communication (the speaker) or the receiver of the communication (the listener) to "this box" did not provide sufficient context for the receiver to determine what "box" was the subject of the directive, then a physical gesture, such as pointing in the direction of the box or touching the box, might accompany the directive generally concurrently with the utterance of "this box" to provide the needed context. If "there" was not previously defined, then again, a physical gesture pointing to the desired destination of the box might be made concurrently with the utterance of "there".

Consider further the directive "paint red". This verbal statement, by itself, lacks both a subject and an object and is ambiguous. However, in interpersonal communication, the receiver would generally understand from the context that he or she is implied as the subject of the statement (i.e., "you paint red"), or possibly another person is implied as the subject, according to the originator's non-verbal cues (e.g., if someone else is present and the originator gestures or faces the other person while speaking). In addition, the originator would likely accompany the verbal statement with a gesture or some other indicator of an object of the statement, such as pointing to the one item among many to be painted red (i.e., "you paint this item red"), thus removing the ambiguity.

As can be seen from the above examples, non-verbal, and in particular gestural, communication supplements verbal interpersonal communication because the verbal language used in interpersonal communication is often incomplete. The verbal component of the communication may even use the wrong words, or incorrect syntax or grammar, but may still be comprehensible to the recipient because the gesture or other contextual information provides correction or confirmation of the intent of the communication.

Further, the verbal component of interpersonal communication is often open-ended or imprecise. Another example is the query "what is the problem?", a statement which by itself omits context. When asked without prior history or context, it is unclear which specific problem for which the originator is soliciting information; the receiver may be aware of many potential sources of problems. However, when accompanied by a physical gesture, such as pointing to a printer, the query is provided with sufficient context so that the receiver knows that the query is directed to soliciting information about a problem associated with the printer.

Thus, while the verbal component of the communication is not complete or precise, the total communication between the originator and the receiver is in fact complete and precise because the verbal component was supplemented by a non-verbal component. In short, interpersonal communication is often multimodal and feature-rich, involving different channels of communication (e.g. speech and gestural communication). However, the completeness and comprehensibility of the total communication is dependent on the receiver's ability to combine process the information conveyed in these multiple modes, and to make inferences, where appropriate.

Human-computer interaction is brokered by the available UI mechanisms provided for the computer, and is therefore limited to the capabilities of those channels. Over the years, computer interfaces have evolved from punch cards, to command line interfaces, to GUIs, pointing, touch, and speech interfaces. Punch cards were challenging to use because the operator had to convert their desired instructions to binary machine code, which was then represented by the punched cards; inputting and validating the communication prior to communicating it to the computer was complex as there was no provision for the computer to infer context or corrections to the input commands. The command line interface reduced some of the complexity of the punch card, allowing operators to input text commands; but again, inputting the communication was and still is complex as the computer was programmed to interpret only specifically defined commands. Special training was often required for both punch card and command line interfaces. The graphical user interface and pointing device supplanted the command line interface in personal computer operating systems because of its use of the desktop metaphor, which reduced the amount of training required for new operators.

The evolution to GUIs represents a shifting of the burden in human-computer communication from the human operator (the originator of the communication) to the computer (the receiver). Initially, the burden was on the human to adapt natural communication to computer-understandable instruction, by converting natural language directives to a computer language; with the introduction of GUIs, the burden is on the computer to convert the simpler user actions (pointing, clicking) as more complex commands. For instance, when a file is to be moved from one directory to another, rather than having to memorize and type a command including the directory paths in the computer file structure, the operator could now simply drag and drop a document icon from one folder to another using a mouse. This evolution continues with the proliferation of touch/kinetic UIs and speech UIs; the burden is on the computing device to interpret the taps and gestures on a touchscreen as commands, and to convert speech to text for parsing into instructions.

However, implementation of even touch/kinetic/perceptual and speech UIs still presents challenges. For instance, speech recognition is currently used in automatic transcription (converting speech to text) to draft documents and messages, interactive voice response services implemented in call centres, voice control of mobile devices. Typically, speech recognition calls for the receipt of speech input, which is converted into words; grammar rules and semantic analysis may then be applied to automatically identify and correct errors. Natural language processing, which is known in the art, can be used to extract meaningful information from text recognized from speech in order to generate keywords or instructions that can be executed by a computer, but natural language processing algorithms are limited in their ability to accurately identify the intent behind a user's incomplete or imprecise communication. Speech-to-text conversion relies on matching the detected patterns in speech input to patterns previously associated with words or letter sounds; therefore, its accuracy is adversely affected by background noise and the clarity of the user's speech. It has been found generally that speech recognition works best when the vocabulary is restricted to a limited number of words/commands, or when the most likely words could be predicted. Thus, successful use of speech UIs sometimes involves regressing to a state where the user must adapt his or her natural expressions to speech patterns that are more easily recognized by the computer: the user must be "trained" to speak in a certain way, or use certain words only, to improve the accuracy of speech recognition, just as he or she earlier had to be trained to use specific commands in a command line interface.

Similarly, touch/gesture control of a computing device is typically limited to a defined library of gestures (taps, double-taps, pinches, swipes) that are mapped to specific commands (select, open, zoom in, scroll); thus, accomplishing complex tasks via a touchscreen, such as painting a particular object in a selected colour, requires multiple sequential touches on the part of the user. Again, the user must be "trained" to make successful use of the touch UI.

Thus, while advances in computer UIs has allowed users to engage with computers using modes of communication that better resemble interpersonal communications involving speech and gesture, the actual communication is still stilted and restricted. It is accordingly desirable to provide a new means of human-computer interaction that improves on, but still can be used with, existing user interfaces. It is further desirable to enable users to engage in multimodal (verbal and non-verbal) communication with computing devices in a manner that enables the computing device to detect context and meaning in a manner analogous to interpersonal communication.

The systems and methods proposed herein enable users to interact with computing devices using interlaced non-verbal input and verbal input, for example, touch, kinetic or perceptual input, all of which is non-verbal, that is concurrent or nearly concurrent with speech or text input, both of which are verbal. The interlaced non-verbal and verbal input received by the computing device and is used to generate executable instructions comprising natural language expressions embedded with objects that together provide the needed context and "completeness" of the communication. As will be seen below, the examples provided herein are directed primarily to the combination of gestures detected via a touchscreen or similar touch-based interface and speech, as touch and speech UIs are well-known in the art, and because touch and speech UIs are common features on currently-deployed computing devices such as tablet computers and smartphones. However, it will be readily appreciated by those skilled in the art that the systems and methods described below may be applied, with suitable modifications, to other verbal and non-verbal UIs that can be implemented on computing devices.

Figure 2:
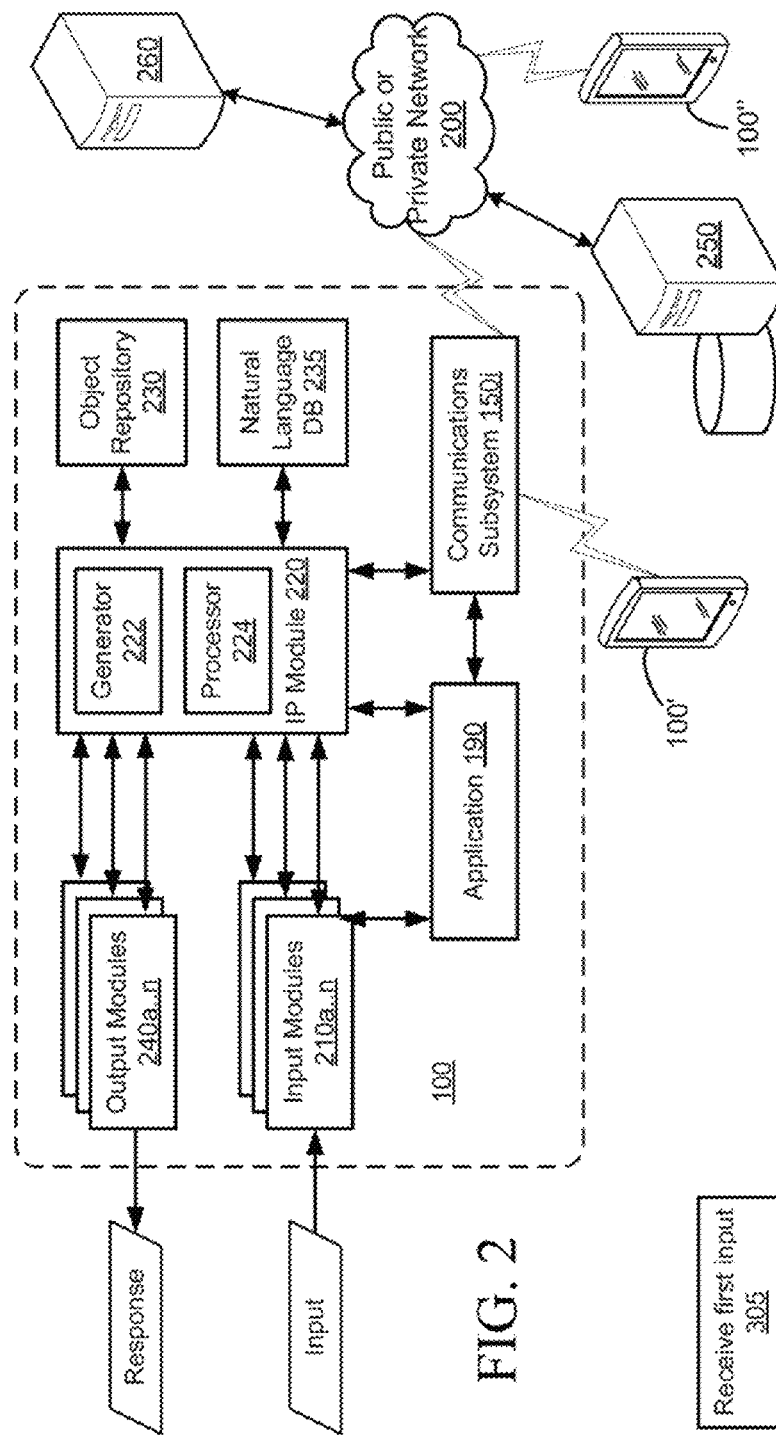
FIG. 2 is a further block diagram illustrating select elements of the computing device and networked entities used in processing multimodal input received at the computing device of FIG. 1.
Figure 3:
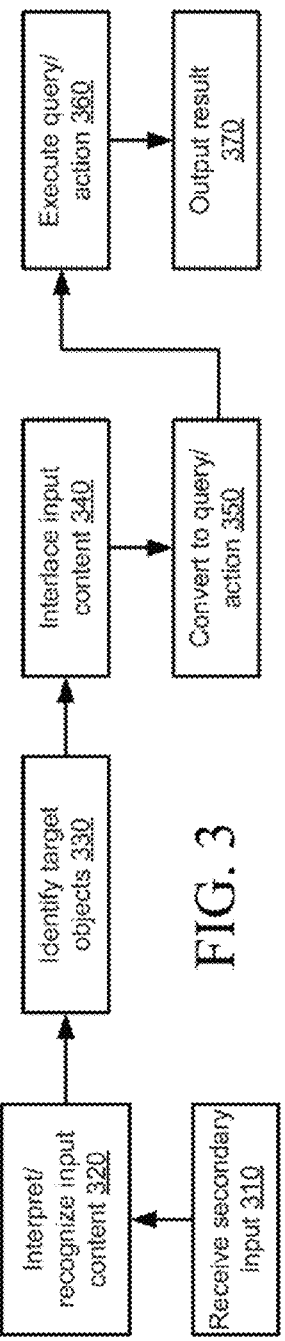
FIG. 3 is a flowchart providing an overview of a method for receiving and processing interlaced multimodal input by the computing device of FIG. 1.

Briefly, non-verbal and verbal input is accepted via a plurality of UIs; the input is combined and recognized, as required, then converted into queries or actions to be executed locally (at the computing device) or remotely; and the result of the query or action communicated back to the user as required. An overview schematic of the principal components at the computing device 100 or remotely that can be used to implement the solution is provided in FIG. 2, and an accompanying flowchart is provided in FIG. 3. At blocks 305, 310 of FIG. 3, the computing device 100 receives raw input in verbal and non-verbal form (user gestures, touches, input text, speech) via input modules 210a-n, as shown in FIG. 2. The input modules 210a-n can include the various UIs described above, as well as communication subsystems 150a-n, cameras 178a-n, and sensors 179a-n. In a single user-computer communication, the raw input can be received over two, three, or more channels; for instance, the user may input touch and gesture on a touchscreen and speak at the same time, thus invoking both the touch UI and speech UI. FIG. 3 illustrates only two inputs, but more are possible.

As part of the communication, the user can identify an entity or several entities with which to interact. These entities can be selected from software objects that are resident on the computing device 100, and/or from other entities that exist or are resident outside the computing device, such as a nearby physical object, remotely located physical or software object, or service. Selection of entities external to the device 100 can include receiving and recognizing indicia (for example, by scanning a QR code or having the device 100 detect an NFC tag, etc., affixed to a physical object). Alternatively or additionally, the computing device 100 might detect a condition or state of the device 100 using another input mechanism, or the computing device 100 might query a device status module such as the GPS subsystem 176, camera 178a-n, sensor 179a-n, a clock (not shown in FIG. 1) and the like. The device status module or other detection of a current device condition or state, such as the current geophysical location of the device 100, or the current time at the device 100, provides additional context to the communication. This contextual information is also provided via an input module 210a-n.

The input modules 210a-n perform initial processing, optionally in cooperation with an application 190 executing on the device 100. As part of this initial processing, the input content is recognized or otherwise interpreted at 320. For instance, verbal input is converted to text if necessary; if the user input text via a keyboard or virtual keyboard, then conversion may not be necessary, but if the verbal input is in speech form, the captured speech will be converted to text by an automated speech recognition (ASR) module. Similarly, if the verbal input is in handwriting form, the captured handwriting or associated gestures will be converted to text by a handwriting recognition or optical character recognition module. Other, non-verbal input is detected by its corresponding UI. Thus, a gesture is detected by a touch UI or kinetic UI, etc. as appropriate. At 330, target objects, if any, are identified from the input data. If the user identified an external object by non-verbal input, for instance by scanning a code or tag affixed to a physical item, or by touching an object displayed on a touchscreen, the object identifier for that item is passed to the interaction processing module 220. In addition, captured and recognized verbal content is also passed to the interaction processing module 220, which includes an interaction object generation component 222 for generating interaction objects, and an interaction object processor component 224 for interpreting and executing the interaction objects. The interaction object is generated by the generator 222 by interlacing both object information and verbal content in a single construct at 340 and importing or retrieving associated information needed to execute an operation on the identified object(s). The creation of the interaction object may require the processing module 220 to retrieve further data, such as MetaObject information, relating to the target object(s) for inclusion in the interaction object. This further data may be retrieved from an object repository 230 resident on the computing device 100 such as a MetaObject database, or alternatively resident at a remote location (e.g., a server 250 accessible over a public or private network 200). The interaction object, once generated, is converted to a query or action (instruction) at 350 for execution. In some instances, conversion requires the identification of synonyms or semantically similar words or while interpreting the verbal component of the received input. This information may be obtained from a natural language database 235, which is shown here to be resident on the computing device 100. The natural language database 235 may alternatively be resident on a remote device, such as the server 250. The query or action is then executed by interaction object processor 224 at 360.

The query or action may be completed by the interaction processing module 220 calling device operating system or application 190 functions, for example via an application programming interface (API) or other suitable interface. In some examples, particularly where the interaction object calls a remote object or service, the interaction processing module 220 might instead invoke a process on a remote device such as the remote computing device 100' (over communication link 150i) or server 260 (over the network 200), for example via a web API.

The response obtained from the query or action is then output by the device at 370, if there is a user-consumable result to be output; one or more appropriate output modules 240a-n, which can be associated with any of the output interfaces provided on the computing device 100 (such as the display 136, speaker 172, haptics module 175).

Thus, as can be seen above, implementation of the solutions described herein may be distributed over one or more devices. In addition, for those computing devices 100 not equipped with sufficiently robust automated speech recognition, captured audio data could be transmitted to a remote device for recognition; the recognized text is then sent back to the computing device 100 for processing by the interaction processing module 220. Or, once the interaction object is constructed by the processing module 220, it may be transmitted to one or more computing devices 100', 100", etc. for execution. If the interaction object is transmitted during a collaborative session, then multiple devices may execute the interaction object at or around the same time.

The foregoing description is but only one implementation example, in which the interaction processing module 220 is provided as a separate component from the applications provided on the device 100. In such cases, the interaction processing module 220 may be provided as a standalone application that interfaces with other functions and applications on the device, or it may be integrated into the operating system. The interaction processing module 220 may function like an "overlay" application that executes concurrently with another application, intercepting input and selectively passing input data to the application for processing, or retaining the input data for generating the interaction object. Alternatively, the interaction processing module 220 may be integrated in individual applications, in which case an interface with the application 190 would not be necessary, unless the interaction processing module 220 was still configured to interact with other applications on the device 100. Software development kits may be made available to application developers to integrate some or all of the functionality described herein in their respective applications.

Figure 4A:
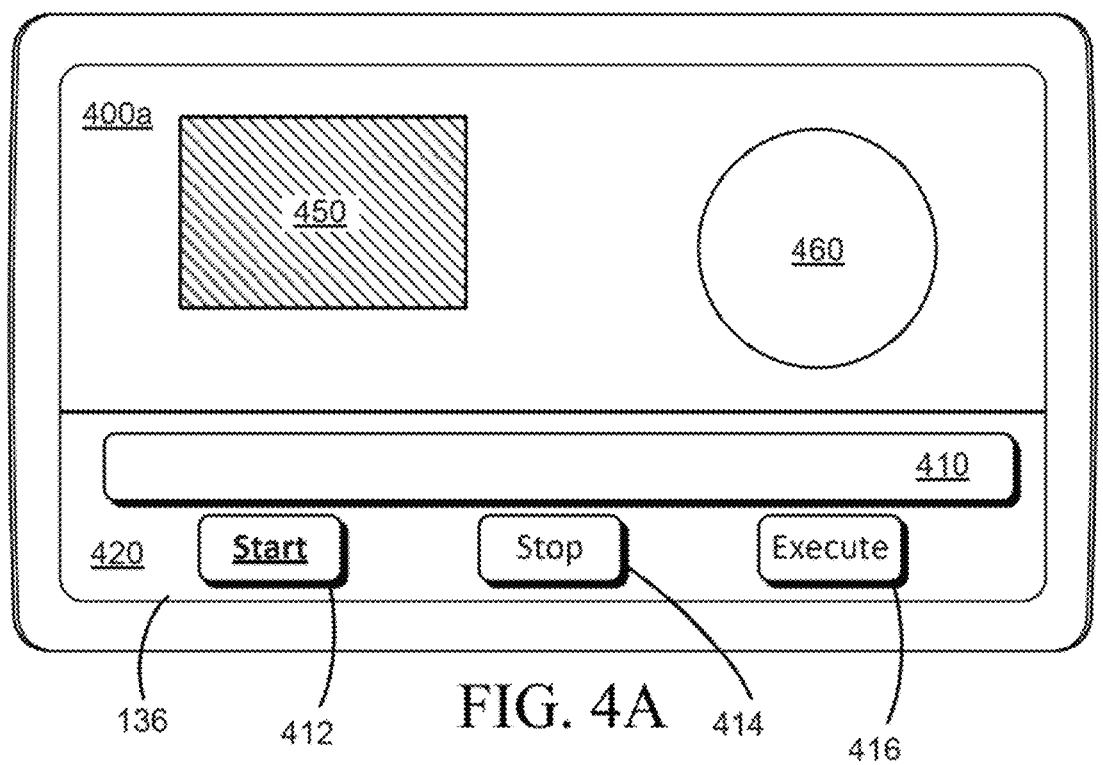
FIGS. 4A to 4F are illustrations of example screens or graphical user interfaces reflecting the receipt and processing of interlaced multimodal input.

FIGS. 4A to 4F illustrate a simple example of interlaced verbal and non-verbal input, in this case speech and touch input, and how they may be processed by the computing device 100 in an object-specific interaction on a local entity. FIG. 4A illustrates an example screen 400a that may be displayed in the computing device display 136. In these examples, the computing device 100 comprises a touchscreen display, so the non-verbal input in these examples is touch-based via the display 136.

The initial screen 400a depicts an example application such as a presentation or drawing program. It will be appreciated by those skilled in the art that these examples certainly need not be limited to graphics design or productivity applications; the solutions described here can be implemented in any suitable type of application. In this first screen 400a, two elements 450, 460 are depicted in an active window region of the screen 400a. In addition, a command input region 420 is included in the screen 400a, and comprises an object display 410 and control buttons (Start 412, Stop 414, and Execute 416). As will be understood by those skilled in the art, the command input region 420 is not a requirement in all implementations of the solutions described herein. For instance, the command input region 420 may be provided in those applications where a text UI (e.g., entry of text by keyboard or virtual keyboard) is desired, or where it is desirable to provide the user with the option to verify and correct input commands in the event of a detected error. The organization and presentation of the command input region 420 and object display 410 may be adapted as required. For instance, the command input region 420 can also include a "Clear" button, which upon activation clears any pending input received but not yet executed.

The elements 450, 460 may be considered to be visual instantiations of software objects defined and stored at the computing device 100, and thus may also be referred to as "objects". These objects can be defined in the computing device 100 as having one or more attributes; the attribute types and associated values will vary according to the object type and application context. Thus, in this example of a presentation or drawing application, the object attributes can include attributes defining the element location and attitude within the document, color, dimensions, label, and so on. Each object is also identifiable by an associated identifier value. Generally, objects such as those represented by elements 450, 460 are software objects that are created during application run time (e.g., in response to a user instruction).

In the example of FIG. 4A, commencement of user input is signalled by the user activating the "Start" button 412 in the command input region 420. Upon detection of the activation, the computing device 100 enters an input mode, during which it monitors input via the speech UI and touch UI (since this example uses speech and touch input). Alternatively, the user may trigger input mode by another action, such as a long press on the displayed object. The user need not be required to manually initiate the input mode on the device 100; in some examples, the computing device 100 may constantly monitor for speech input and attempt to integrate any recognized verbal commands with non-verbal input received concurrently or near-concurrently with the speech input. In this initial example, however, the user can explicitly define the start and stop of interlaced verbal and non-verbal input.

Figure 4B:
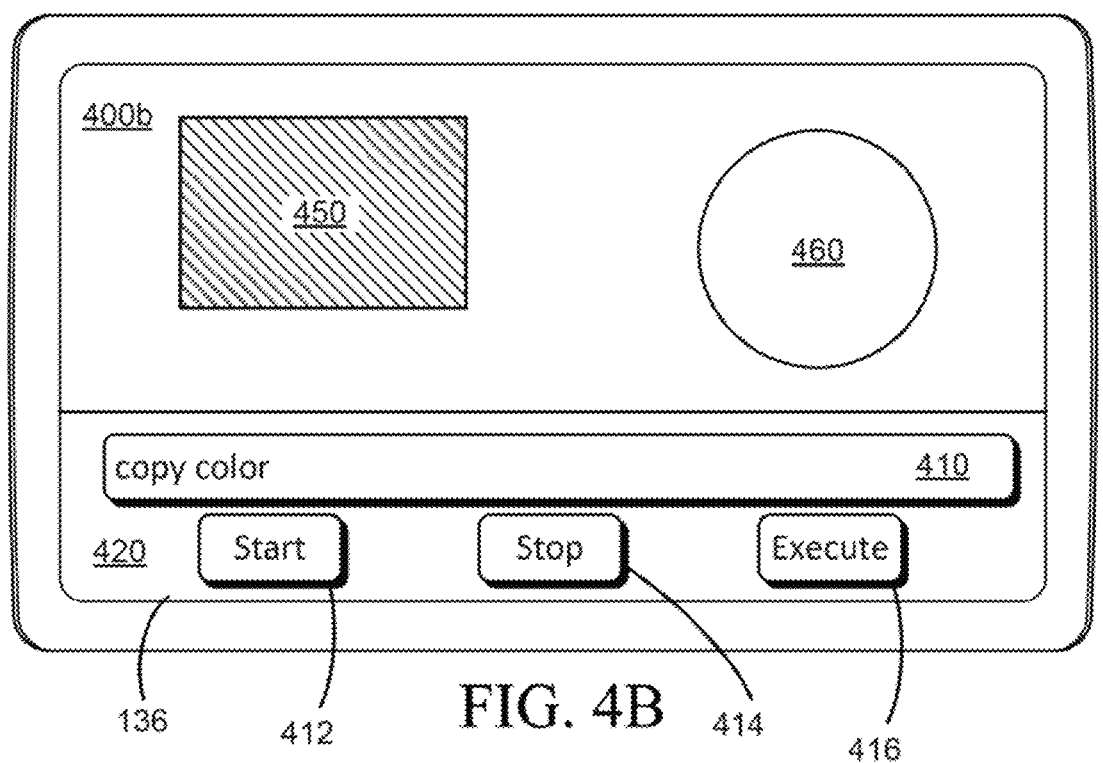

While the computing device 100 is in input mode, the user can commence verbal and non-verbal input, as illustrated in FIG. 4B. This figure shows the screen 400b after the initiation of input mode, where the user has begun speaking a command—in this case, "copy color". The speech UI on the computing device 100 receives the speech, and an automated speech recognition component at the device can recognize and convert the speech to text. In this example, the text is echoed back to the user by displaying it in the object display 410 as shown in FIG. 4B; in other examples, the device 100 may not provide feedback while the user is speaking, but only once the initial interpretation of the interlaced verbal and non-verbal input is complete. In some examples, the speech, as it is detected, is temporarily stored for the immediate purpose of carrying out ASR, then discarded once ASR is complete. However, the recorded speech may be maintained longer in memory to support subsequent error correction, if needed.

Figure 4C:
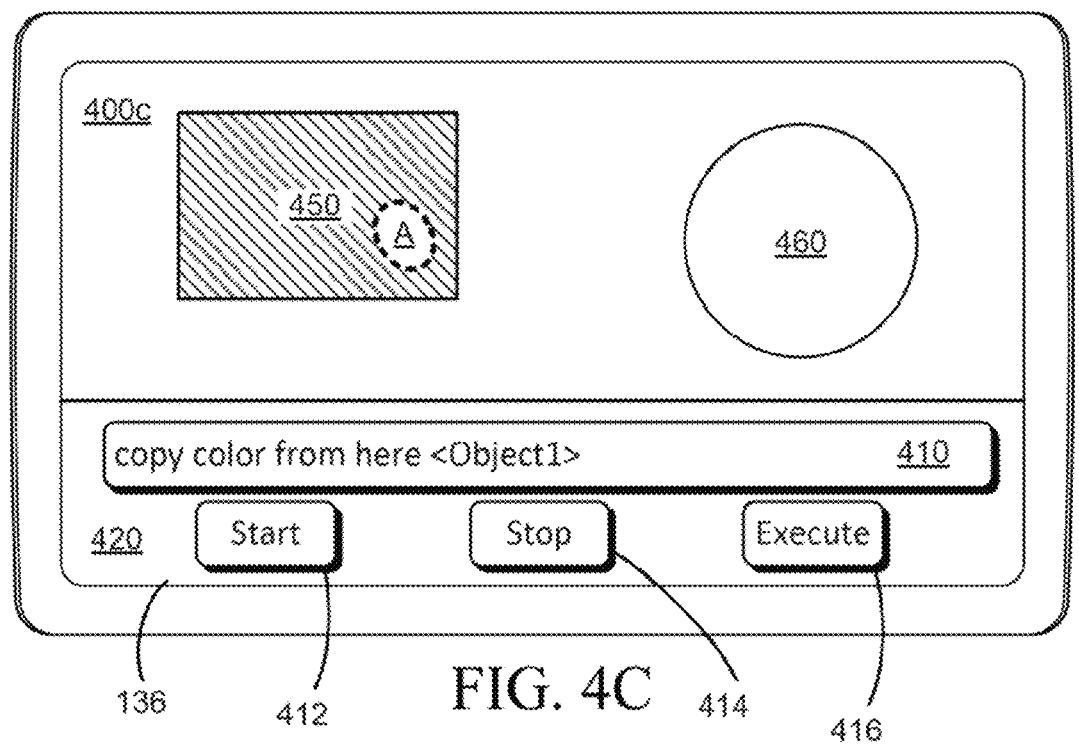

During the input mode, the user also provides non-verbal, touch input. Turning to FIG. 4C, at about the same time that the user is saying "copy color" (e.g., during this speech, while continuing to speak "from here", or immediately after speaking), the user can use touch to select one of the elements 450, 460 in the touchscreen display 136—in this case, element 450—as indicated by touch point A. Element 450, as noted above, is a representation of a software object having attributes. On detection of the selection of element 450, the computing device inserts a corresponding indicator for the object in the recognized text received via the speech UI. This is illustrated in the object display 410 in screen 400c, which now reads "copy color from here <Object1>". "Copy color from here" was spoken by the user, and converted to text; "<Object1>" is an embedded indicator identifying the selected software object by software object name (in this case, "Object1"). The name value may be defined by the application in which the object is actually defined; the tag value in this case can distinguish between software objects, hardware objects, locations, and similar constructs. Since the name by itself may not be sufficient to uniquely identify the selected object, an object identifier or underlying source object (here referred to as an "objectID") is also defined for the object, although not explicitly shown in the object display 410.

Figure 4D:
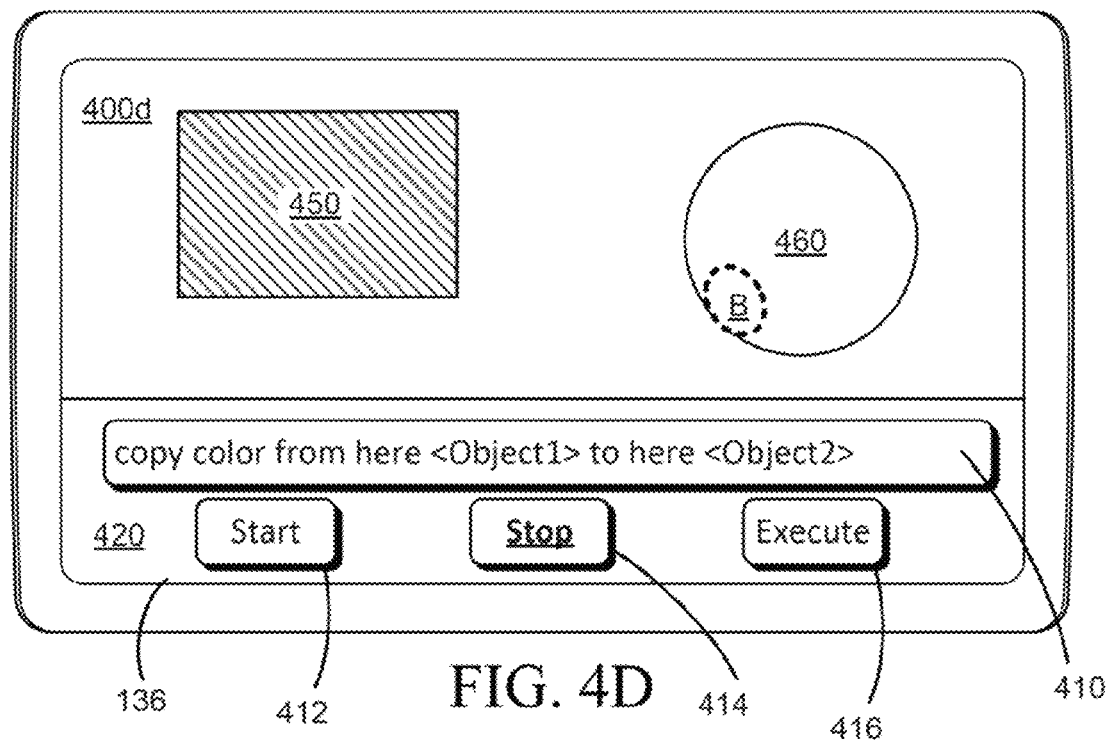

The user in this example continues providing verbal and non-verbal input, in this case "to here" and a further as shown in the screen 400*d* of FIG. 4D. The object display 410 now shows the words "to here" once these words are recognized by the automated speech recognition module. In addition, the user continues providing non-verbal input by touching the second element 460 on the screen 400*d*, as indicated by touch point B. On detection of the second element 460, the computing device 100 displays the indicator for this further object in the object display ("<Object2>"). Again, an objectID may be defined for the object, although not shown in FIG. 4D. The entire string displayed in the object display 410 thus represents a combination of natural (spoken) language, a verbal component, with object references embedded therein ("copy color from here <Object1> to here <Object2>"), presented in a generally human-readable and comprehensible manner.

Figure 4E:
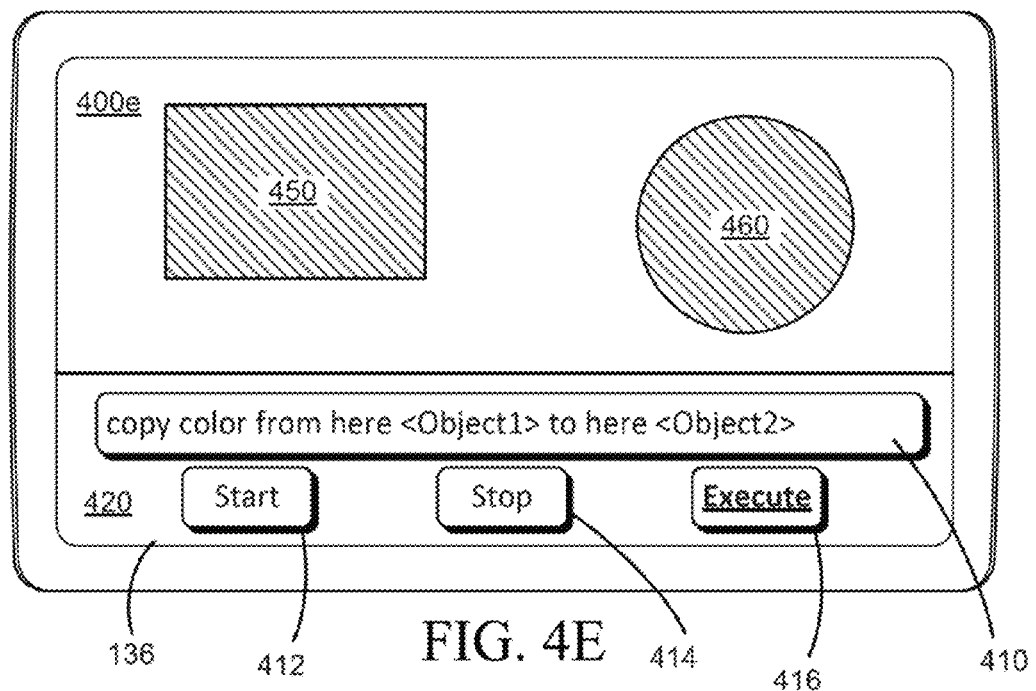

Once the user has determined that verbal and non-verbal input is complete, he or she indicates that input is at an end by activating the "Stop" button 414 as shown in FIG. 4D. At this point the computing device 100 exits input mode. Again, though, express termination of input mode is not necessary; the computing device 100 may instead automatically determine when input has ceased, for example by detecting a condition of no input for a preset period of time, a drop in detected sound volume by the speech UI, or an oral command indicating the end of input (e.g. the spoken word "end" or "stop"). When the user has completed his or her input and is satisfied with the content of the object display 410, the "Execute" button 416 is activated to invoke interpretation and execution of the detected input as shown in screen 400*e* of FIG. 4E. Once again, explicit activation of an Execute command is not necessary; the device 100 may automatically initiate interpretation. In this case, the detected input is interpreted as an instruction to copy the color of the first object, element 450, to the second object, element 460. The result is also shown in FIG. 4E.

Figure 4F:
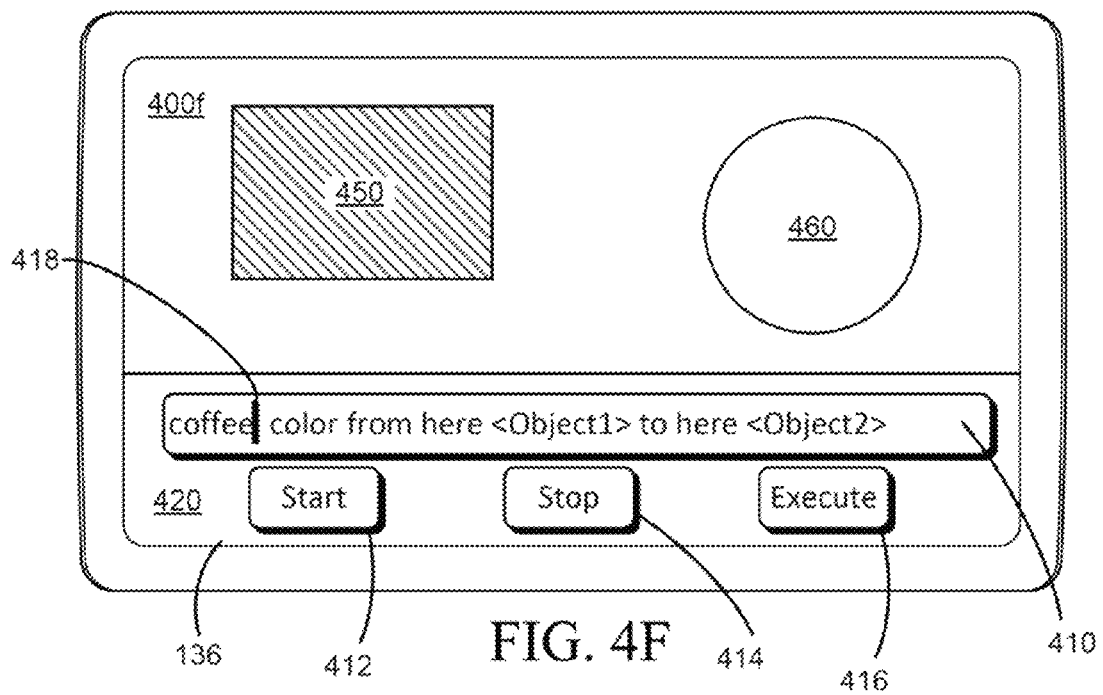

In some cases, whether due to the user's manner of speaking, background noise, or another cause, the automated speech recognition process may not accurately interpret the user's spoken commands. If the object display 410 is provided, the user may be provided an opportunity to correct the converted text prior to interpretation and execution of the detected input. FIG. 4F illustrates a further screen 400*f* including the object display 410, where it can be seen that the first word was misrecognized as "coffee". In this example the user may employ the touch and a text UI to edit the content of the object display 410 (insertion bar 418 indicates that the computing device 100 is currently in an editing mode, in which the user can edit the detected input) before activating the "Execute" button 416.

As described above, the combined verbal and non-verbal input is used to construct an expression comprising natural language (the recognized text from the user's input speech) with embedded object references identified from the input. The resultant data construct is referred to herein as an "interaction object"; when the detected input is interpreted and executed in the foregoing example, it is this interaction object that is interpreted and executed. The object references comprised in the interaction object include the objectIDs described above. In addition, the interaction object relies on other definitions provided for the referenced objects. In order to execute operations on a given object, the executing entity must know what operations the object supports, and the attributes associated with that object. Accordingly, the computing device 100 can store additional "MetaObject" structures that provide definitions for each referenced object. "MetaObjects", as used herein, semantically define an object to enable interaction via natural language commands. The interaction object constructed from the verbal and non-verbal input therefore includes at least a reference to the MetaObjects corresponding to the objects identified from the input (e.g., an identifier, referred to herein as a "MetaObjectID").

Figure 5:
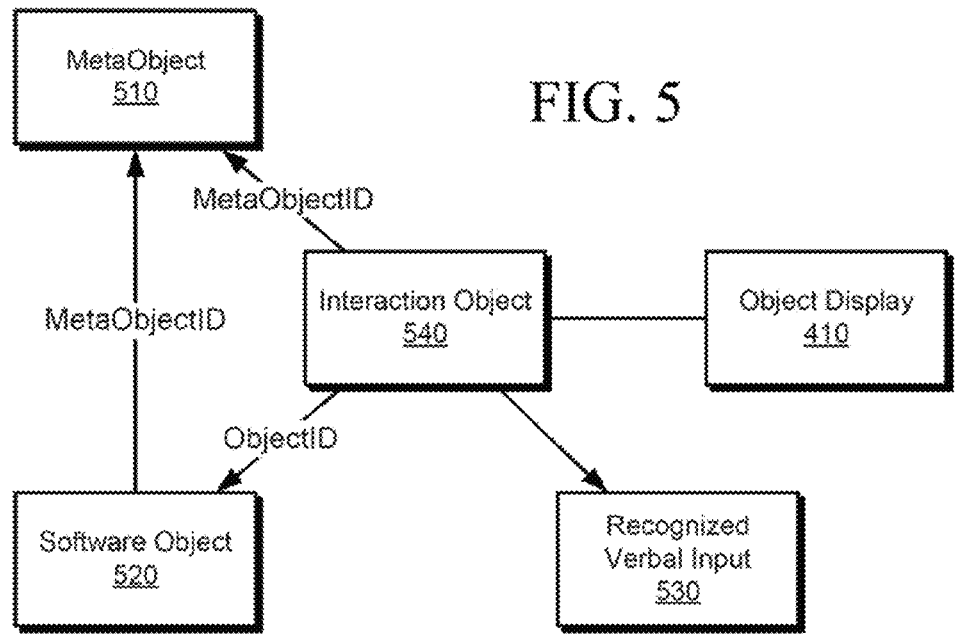
FIG. 5 is a schematic diagram illustrating possible relationships among a target software object identified by the interlaced multimodal input, a MetaObject, and an interaction object defined therefrom.

FIG. 5 schematically illustrates the dependence of the interaction object 540 definition on the MetaObject 510, identified software object 520, and captured and recognized verbal input 530. In addition, the definition of the software object 520 is itself dependent on its corresponding MetaObject 510. As indicated in FIG. 5, the content in the object display 410 reflects the content of the interaction object 540; however, the object display 410 may not display content for all components in the interaction object schema, as may be seen by comparing the example object display 410 content of FIGS. 4A-4F to the example XML representation of an interaction object discussed below. The user may, as described in connection with FIG. 4F above, be able to edit the recognized text from the recognized verbal input 530; changes to the recognized text, or original text entered by the user and received by the object display 410 are used to update the content of the interaction object 540.

Figure 6:
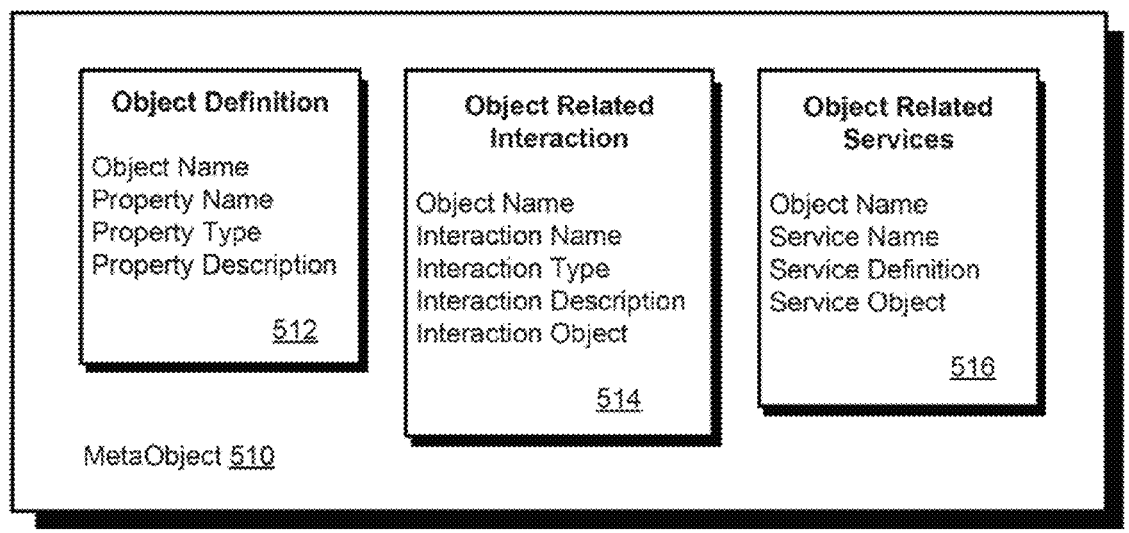
FIG. 6 is a schematic diagram illustrating an example schema for a MetaObject.

The MetaObject is typically predefined for each class of software object that an application can generate or operate on. MetaObjects can also be provided to the computing device 100 from another source, for instance from another computing device or server comprising a MetaObject repository or library, or a remote device that is providing the interaction object to the computing device 100 for interpretation and execution. FIG. 6 illustrates an example schema for use with MetaObjects. An object definition table 512 semantically defines attributes and operations for the object, such as type, label (name), location, and methods, and can include natural language expressions of these, synonyms and semantic similarities, and associated phonetic codes for use in assisting in matching up the MetaObject to verbal input. An object related information table 514 defines operations that apply at the object level to the relevant objects (as opposed to operations that can be applied at the attribute or operation level; e.g., linking an object of one type to objects of another type). In some instances, services may be associated with a given object, as in the case where the object is physical (e.g., a printer may be associated with a technical support service and a cartridge/toner replacement service); if such services exist, they are defined in an object related services table 516.

The interaction object itself may be contained in any suitable data structure. One possible format is an XML-based format, which is easily portable (transferrable to other devices for interpretation and execution). The design of an XML schema or similar schema to implement interaction objects will be understood by those skilled in the art.

Table 1 illustrates an example XML representation of an interaction object generated as a result of the instruction captured in FIGS. 4A-4E, to copy the color of a first element to a second element:

TABLE 1

Example XML representation of an interaction object

```
<InteractionObject>
    <ObjectDisplay>ObjectDisplay1</ObjectDisplay>
    <Text>copy color from here</Text>
    <Gesture>
        <ObjectType>SO</ObjectType>
        <ObjectName>Object1</ObjectName>
        <ObjectID>/Draw20/Layers/Layer1/Object1/ObjectID>
        <MetaObjectID>www.geometricshapes.com/polygon/rectangle
        </MetaObjectID
    </Gesture>
    <Text>to here</Text>
    <Gesture>
        <ObjectType>SO</ObjectType>
        <ObjectName>Object2</ObjectName>
        <ObjectID>/Draw20/Layers/Layer1/Object2</ObjectID>
        <MetaObjectID>www.geometricshapes.com/ellipse/circle
        </MetaObjectID>
    </Gesture>
</InteractionObject>
```

As can be seen from the above example, the interaction object 540 in this case comprises a number of components derived from the detected verbal and non-verbal input, which together form an interaction expression for interpretation and execution by the computing device 100. In the sequence of events depicted by FIGS. 4A-4E, speech input was received prior to the initial touch (non-verbal) input; the phrase recognized from the speech input using ASR is therefore included as initial <Text> input prior to a first <Gesture> input, which is determined from the first detected touch input selecting the first element 450. The first <Gesture> content includes an identification of object type, which in this case is a software object ("SO"); the object name ("Object1"); an ObjectID as described above ("/Draw20/Layers/Layer1/Object1"), and a MetaObjectID ("www.geometricshapes.com/polygon/rectangle"). The MetaObjectID in this example thus refers to a source external to the computing device, accessible via the specified Uniform Resource Indicator. In some examples, MetaObject information beyond the identifier may be imported into the integration object 540 at the time the integration object 540 is assembled by the computing device 100. The remaining <Text> and <Gesture> content is ordered according to detected receipt by the computing device 100. The construction and tagging of the interaction object 540 is discussed in further detail below.

Figure 7:
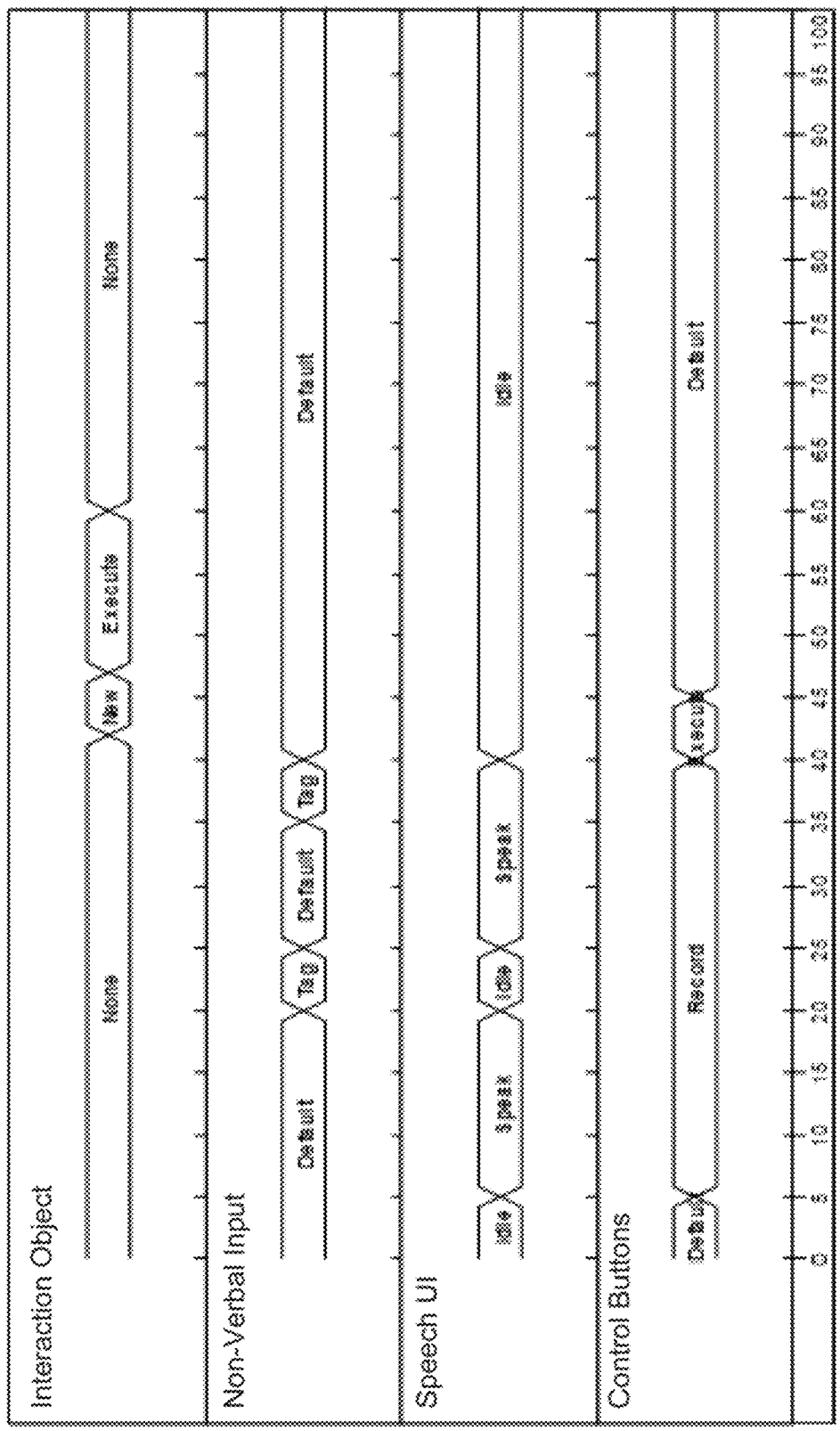
FIG. 7 is a timing diagram illustrating possible concurrence of verbal and non-verbal input.

The arrangement of components is determined by the relative timing of the various verbal and non-verbal inputs. FIG. 7 illustrates a possible timing diagram for the inputs in the example of FIGS. 4A to 4E. It should be noted that the time scale provided is not necessarily to scale with typical English speech or computer processing. Initially, before the user begins input, the various components of the computing device 100 are in a default or idle mode—in this case, the speech UI of the device 100 is in an idle mode, awaiting activation; the non-verbal input is in a default mode which, in some examples, may mean that non-verbal input is being handled in a default manner by the application currently executing in the foreground. If control buttons or other control means for permitting the user to explicitly place the computing device 100 in an input mode for multimodal input is provided, these are also initially in a default state. Since no multimodal input has been received at this stage, there exists no interaction object.

Once the input mode has been invoked (at time t=5), the computing device begins recording multimodal input, as indicated by the state of the control buttons. In this example, the user has begun to speak a command ("copy color from here"); the speech UI detects this segment of speech from time t=5 to t=20. At this point, the user pauses at time t=22 to provide non-verbal input in the form of a touch as described above, and a first object (Objects) is identified by the non-verbal input (the first "tag") event in the Non-Verbal Input timeline. At this point, the speech UI is temporarily idle as the user has paused in speaking. The user then resumes speaking at time t=25, and while still speaking, also provides the second non-verbal input at time t=37 identifying the second object (Object2). This time, the non-verbal input is detected while speech is being detected by the speech UI, as can be seen in the timing diagram. The non-verbal input and the verbal input terminate at around the same time at t=40. It will be understood that this simple timing diagram example does not reflect slight timing differences that can occur with multimodal input; for instance, the completion of non-verbal input may precede or follow the completion of verbal input. Overall, the entire verbal input from time t=5 to t=40 can be considered to be concurrent with the non-verbal input, even where non-verbal input occurs in the absence of verbal input (as at t=22) or vice versa, as both the verbal and non-verbal input comprise part of the same input session.

At about time t=40, the user in this instance invokes execution of the input command (for example by activating the Execute button 416 in FIG. 4E, as indicated in the Control Buttons timeline in FIG. 7); or else the computing device 100 determines by alternative means that input is complete. With the completion of multimodal input, the complete interaction object can be constructed. It will be appreciated, though, that as some user input can be completely understood by the interaction processing module 220 before all multimodal input is complete (since non-verbal input such as selection of an element or object is often unambiguous and can be identified independent of any concurrently detected speech input), the construction of the interaction object may in fact commence prior to complete recognition of all verbal input (e.g., before all speech input has been processed by the ASR module). This will be more apparent in the discussion of FIG. 9, below. The new interaction object is accordingly completed at a point shortly after the use invocation.

When the interaction object is constructed, reference is made to the detected start and end times to determine sequence. Timing information may be included in the interaction object, as shown by the example XML structure below in Table 2:

TABLE 2

Example XML representation with timing

```
<InteractionObject>
    <ObjectDisplay>ObjectDisplay1</ObjectDisplay>
    <Speech-to-text start_time=5 finish_time=20>copy color from
here</Speech-to-text>
        <Speech-recording name="Recording1">RecordingAddress1</
        Speech-
recording>
        <Gesture time=22>
            <ObjectType>SO</ObjectType>
            <ObjectName>Object1</ObjectName>
            <ObjectID>/Draw20/Layers/Layer1/Object1</ObjectID>
            <MetaObjectID>www.geometricshapes.com/polygon/rectangle
            </MetaObjectID
        </Gesture>
```

TABLE 2-continued

Example XML representation with timing

```
    <Speech-to-text start_time=25 finish_time=40>to here</
Speech-to-text>
    <Speech-recording name="Recording2">RecordingAddress2</Speech-
recording>
      <Gesture time=37>
        <ObjectType>SO</ObjectType>
        <ObjectName>Object2</ObjectName>
        <ObjectID>/Draw20/Layers/Layer1/Object2</ObjectID>
        <MetaObjectID>www.geometricshapes.com/ellipse/circle
        </MetaObjectID>
      </Gesture>
</InteractionObject>
```

In this example, the start and end times of the detected speech segments are included in Speech-to-text tags, in place of the previous Text tags in Table 1. Furthermore, information about the stored recordings of the input speech are included in the interaction object ("<Speech-recording name="Recording1">RecordingAddress1</Speech-recording>"). Here, the verbal input segments are stored as individual recordings ("Recording1" and "Recording2" and can be referenced by the interaction processing module 220 by address ("RecordingAddress1", "RecordingAddress2"). Input speech may be divided into separate segments according to detected pauses (silences) in the input speech, or alternatively according to the start time of non-verbal input; in some cases, for instance, if the user selects the first object via non-verbal input prior to speaking "from here", the order of the speech-to-text and gesture components in the XML representation of the interaction object may be different from what is shown above.

The example structures of the interaction object 540 above illustrates how the user's speech, as recognized by the computing device 100, is modified to generate the interaction expression defined in the interaction object. In the example of FIGS. 4A-4F, and generally in the examples provided herein, the user's verbal input is generally presumed to be English, and following a subject-verb-object sentence structure. It will be appreciated by those skilled in the art, though, that the examples and embodiments herein may be adapted as required for use in processing verbal input in languages employing different sentence structures (e.g., subject-object-verb) or morphosyntactic alignments.

Figure 8:
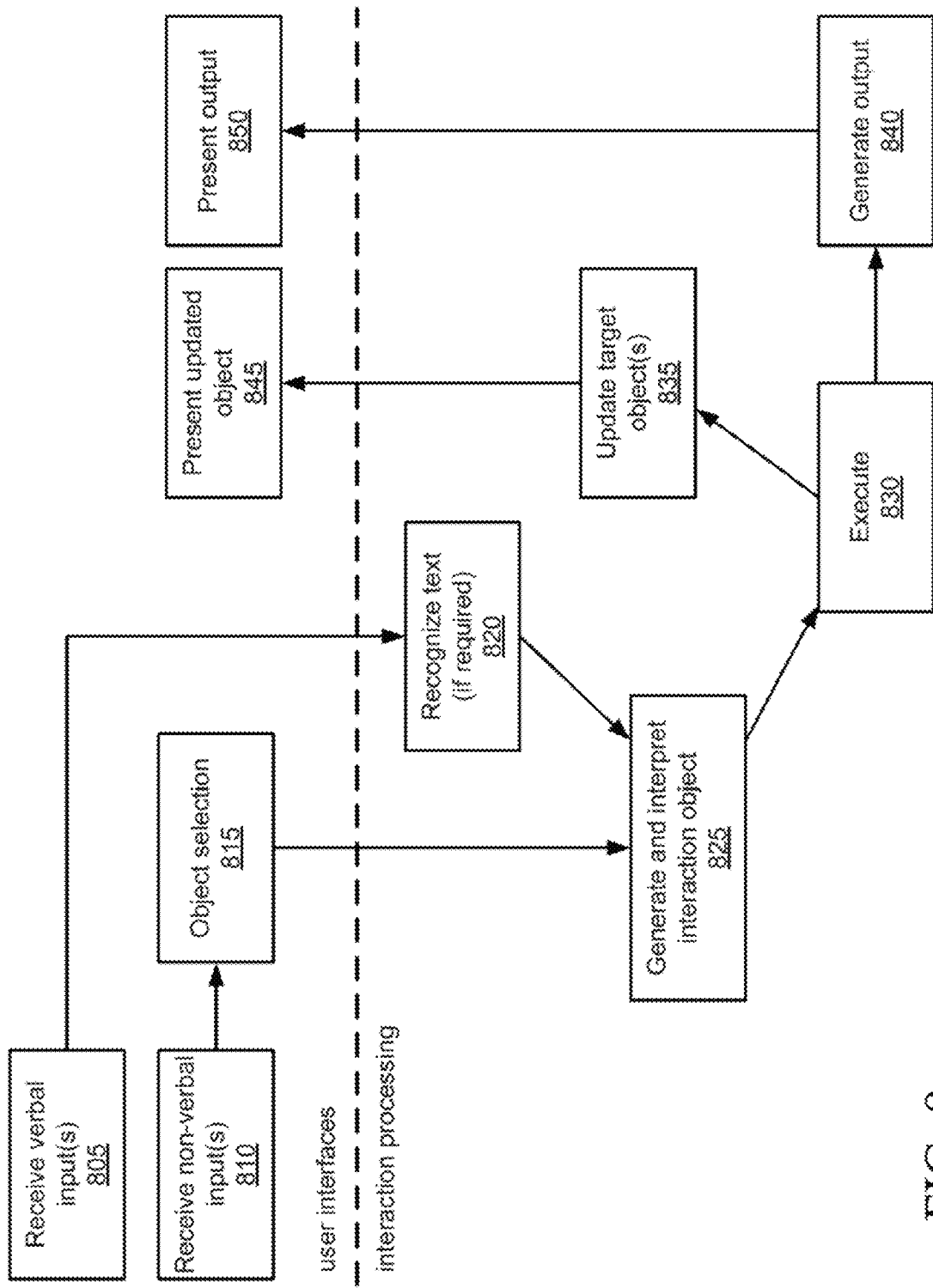
FIG. 8 is a flowchart illustrating a method for receiving and processing verbal and non-verbal input.

Once the interaction object is constructed in response to the detected verbal and non-verbal inputs, it is interpreted by the interaction processing module 220. FIG. 8 depicts an overview process for constructing and executing the interaction object. Initially, in an input mode, the computing device 100 receives the multimodal input via various user interfaces. Thus, at block 805, one or more verbal (e.g., text and/or speech) inputs are received; at block 810, one or more non-verbal inputs are received. These inputs can be generally concurrent, and may be received in any order. As noted above, the user may be provided with an opportunity to edit the detected input; this may be considered to be included in blocks 805 and 810. Edits may be received in response to a prompt from the computing device 100, for instance if it is detected that an object cannot be correctly identified or tagged, or if there is insufficient information to permit execution of the interpreted interaction object; in such cases, interaction processing is halted pending further input.

At 815, in response to the non-verbal input, which generally designates a specific object, the object is selected in the user interface. This selection may be carried out at the application level (e.g., the drawing program of FIGS. 4A-4F). The selected object information is passed to the interaction processing module 220, which uses this information to generate the interaction object. In the meantime, at 820, the computing device 100 executes ASR (if the verbal input is speech) and also provides this information to the interaction processing module 220, which integrates it with the received object information. The interaction object is thus generated and interpreted 825. Further detail concerning the generation and interpretation of the interaction object is provided with reference to FIG. 10. At 830, the operations defined by the interaction object are executed. Possible results of the execution include updating of the target object(s) of the input 835; in the example of FIGS. 4A-4F, the element 460 is updated with a new attribute (color). The updated object (e.g., the object with a new color) is then presented to the user via a suitable user interface at 845. The result of the execution can be generation of some other output 840, which is then presented to the user via a suitable user interface at 850. For example, the interaction object may comprise a query by the user about the object (e.g., "what is the size of this object?"), in which the case the response may be presented visually as text (e.g., "1 inch tall and 2 inches wide") or a graphic representation, or as an audible response.

The operation executed in this example is a change to an attribute value for the destination object 460. Changes to attributes such as this (e.g., a change in color, content, location, formatting, label, etc.) may be considered to be an "object-specific" interaction, as the result of executing the interaction object is a change to a state or condition of a specified object. However, operations executed in response to multimodal input can include object-related interactions that operate at the object level, rather than the attribute level. For instance, an operation may be carried out on the entire object to delete or duplicate an existing object, create a new object, save an object, retrieve an object from a data store or from another document or file, link an object to another one, or send an object to a recipient. Another example is the case of an object which itself is a representation of another entity, such as a map. While a computing device 100 may store map data, which can include geographic information, roadmaps, satellite data, traffic and travel time information, etc., this type of data is frequently received by computing devices on an as-needed basis over a network and cached temporarily in response to user requests for certain geographic information. The user may interact with the displayed map information in the manner described above; however, the attributes of interest are not necessarily the attributes of the actual data downloaded to the device, but attributes of the real physical features represented by the downloaded data. Common user queries in relation to selected locations on a map include "What is this?" (referring to a geographic feature); "What is the distance between [first point] and [second point]?"; "How long will it take me to drive to [location]?"; "Is there more information about this place?". In these cases, the attribute information necessary to answer these queries is obtained from a remote source. Other queries can include a command to change the displayed view (e.g., from a street map view to a satellite view), which will also require retrieval of graphic information from the remote source.

Figure 9:
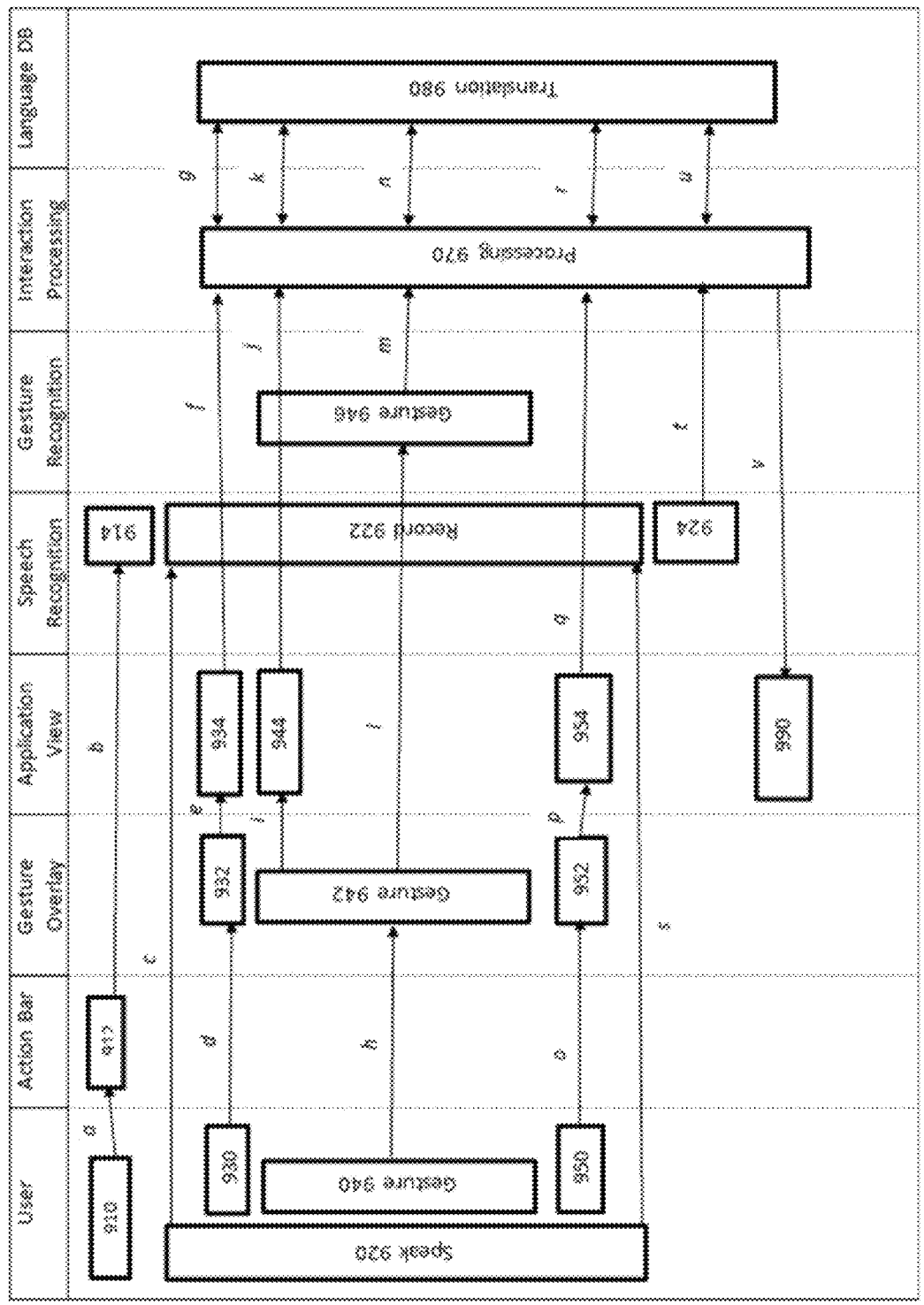
FIG. 9 is a schematic diagram illustrating the timing of thread execution and message passing in the method of FIG. 8.

As suggested above, at least portions of the interaction object can be defined while input is still being received by the computing device 100. FIG. 9 illustrates interlaced verbal and non-verbal input (in a more complex example than that of FIGS. 4A-4F), and the resultant concurrent processing of the various inputs by separate threads executing on the device 100. A main user interface thread manages the presentation of user interface screens and elements such as the command input region, gesture overlay, and application view. The command input region and object display (such as that illustrated in FIGS. 4A-4F) are referred to in FIG. 9 as the "action bar". The application view comprises the user interface screens for the application currently executing in the foreground on the computing device 100. The application view presents selectable objects to the user (such as the elements 450, 460 in FIGS. 4A-4F). The gesture overlay is a transparent layer that overlays the application view and intercepts touches and gestures; in the multimodal input mode, touches and gestures intercepted by the gesture overlay may not be dispatched to the application view. In some examples, separate threads may manage one or more of the action bar, application view, and gesture overlay. A speech recognition thread, when invoked, processes input speech to recognize text. A separate gesture recognition thread, when invoked, processes input gestures for use by the interaction processing thread.

In the example of FIG. 9, the user invokes a multimodal input mode by an input 910, such as activation of a "Start" button as represented by interface element activation 912 and arrow a, or some other action that is detected by the computing device 100. The detection of this activation in turn causes invocation (arrow b) of the speech UI and the speech recognition thread 914, which starts listening for speech input. After the commencement of multimodal input mode, the user in this example begins speaking for a period of time, as represented at 920. The speech is picked up by the speech UI and passed to the speech recognition thread (arrow c), where the speech is recorded for subsequent recognition processing (block 922).

In the meantime, however, the user engages in several gestural inputs. First, a touch is detected by a touch UI on the device 100, as indicated at 930. This touch occurs after speech 920 has commenced. The touch is intercepted by the gesture overlay as indicated at 932 (arrow d). In this case the gesture overlay dispatches the event (arrow e) to the application view in order to identify an object that is the target of the input. The application view identifies a first object that is identified by the touch. As a result of this selection, the identified object sends a message (arrow f) to the interaction processing thread 970. The message can include identifying information for the object and MetaObject information, its location, attributes and corresponding values, methods in natural language (expressed as words and/or phrases) and phonetic codes corresponding to the natural language. It may be noted that at the time the first object sends the message f to the interaction processing thread, the speech input 920 is still ongoing. The interaction processing thread 970, having this first object data, can start processing the first object. This can include querying a natural language database (represented by translation thread 980) for possible equivalents (synonyms and semantic similarities) relating to the methods identified for the object. These equivalents may be used to "translate" natural language received by the interaction processing module 220. Synonyms and semantic similarities are discussed below.

After the first touch, the user then commences a gesture 940; in this example, the gesture 940 is another touch-based input, although it will be understood by those skilled in the art that the input need not be a touch-based input (for example, it may be a movement detected by a kinetic UI). Again, the gesture is captured by the gesture overlay as indicated at 942 (arrow h). At the beginning of the gesture, the event is dispatched to the application view (arrow i), which identifies a second object 944. A further message is dispatched by this second object (arrow j) to the interaction processing thread 970. Again, the thread 970 can start processing this additional data, retrieving similar information as described above for the first object (arrow k).

The complete gesture captured by the gesture overlay is subsequently dispatched to the gesture recognition thread 946 (arrow l). Note that the object selection had already been detected at the start of the gesture 942, and dispatched to the application view; the completed gesture, however, is not dispatched to the application view in this case. Once gesture recognition is completed, the recognized gesture is passed (arrow m) to the interaction processing thread 970. Again, the thread 970 can start processing the gesture data, which can also include retrieving synonyms or semantic similarities pertaining from the gesture (arrow n).

Having completed the gesture, the user performs yet another touch 950 while the speech input is ongoing. The touch is captured by the gesture overlay as indicated at 952 (arrow o), and again dispatched to the application view (arrow p) to identify a target object for the touch. A third object 954 is identified by the application view, and again, a message is passed to the processing thread 970 (arrow q) as with the first and second objects. Once again, the thread 970 can begin processing the third object data, retrieving equivalence data (arrow r) and MetaObject data.

At this stage, the user completes speech input. The end of the speech input is detected by the speech recognition thread, which was recording the speech (arrow s). The speech recognition thread then begins processing the recorded speech to recognize text, as indicated at 924. The recognized text and associated time markers are sent to the interaction processing thread 970 (arrow t), and can now be interlaced with the received objects in the interaction object. In the meantime, prior to receipt of the recognized text, the interaction processing thread 970 may carry out predictive analytics in anticipation of speech input, based on the object data received to date. For instance, knowing what methods are available for the objects identified by the non-verbal input, certain natural language can be identified as more likely to be associated with the objects. After receiving the recognized speech, the thread 970 again retrieves possible synonyms and semantic similarities corresponding to the text (arrow u) from the natural language database. With the object data, text, timing, and equivalents, the complete interaction object can be constructed, then interpreted and executed. The output generated from the execution may then be presented, as appropriate, in the application view as indicated at 990 (arrow v).

Figure 10:
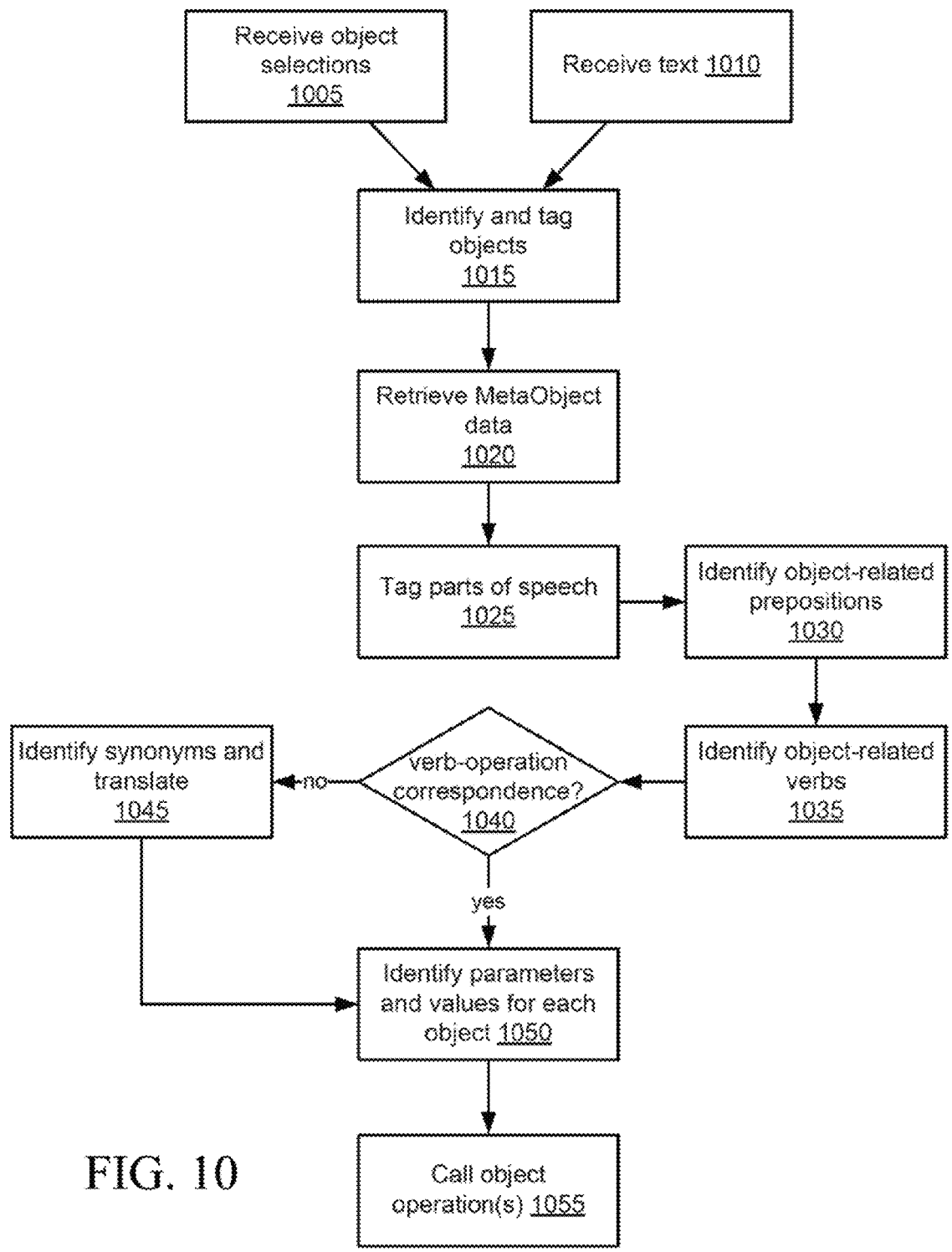
FIG. 10 is a flowchart illustrating further details of the method for processing verbal and non-verbal input.

Interpretation of the interaction object relies on natural language processing and the identification of synonyms and semantic similarities, mentioned above. FIG. 10 is a flowchart illustrating further detail of the generation, interpretation, and execution of the interaction object. At 1005, object selections are received by the interaction processing thread (see object selection 815 of FIG. 8 and receipt of first, second and third object messages in FIG. 9). At 1010, text is received by the interaction processing thread. This text may be text recognized from speech, as in the example of FIG. 9; it may also be directly input by the user. As noted above, receipt of this information at 1005 and 1010 may occur in a different order and may be interlaced (e.g., several instances of 1005, 1010, or both, received alternately or consecutively) from verbal and non-verbal inputs occurring concurrently.

As part of interaction processing, the objects referenced by the inputs are identified at 1015. The identification includes tagging the object according to object type. Table 3 provides a list of example object tags for use in interaction objects:

TABLE 3

Examples of object tags

| Tag | Type | Description |
| --- | --- | --- |
| SO | Software | Software Object |
| PO | Physical | Physical Object |
| RSO | Software | Remote Software Object |
| RPO | Physical | Remote Physical Object |
| NFC | Interface | Near Field Communication |
| BT | Interface | Bluetooth ™ |
| WF | Interface | Wi-Fi ™ |
| IP | Address | Internet Protocol Address |
| URL | Address | Uniform Resource Locator |

The object type determines what operations can be accessed and performed for the tagged object, as different types of operations are available for different object types (e.g., software vs. physical). In the example of FIGS. 4A-4F and the above example XML expressions of the interaction object, the objects identified by the non-verbal input (Object1 and Object2) are both software objects. Once the objects are identified at 1015, MetaObject data can be retrieved for the objects at 1020.

Parts of speech related to the tagged objects are then identified. In natural language processing, tagging parts of speech is generally the first step in interpretation, and different styles are known in the art. Table 4 sets out an example of parts of speech tagging, as developed for the Penn Treebank Project (www.cis.upenn.edu/~treebank):

TABLE 4

Examples of parts of speech tags

| Tag | Description |
| --- | --- |
| CC | Coordinating Conjunction |
| CD | Cardinal Number |
| DT | Determiner |
| EX | Existential there |
| FW | Foreign Word |
| IN | Preposition or Subordinating Conjunction |
| JJ | Adjective |
| JJR | Adjective, comparative |
| JJS | Adjective, superlative |
| LS | List Item Marker |
| MD | Modal |
| NN | Noun, singular or mass |
| NNS | Noun, plural |
| NNP | Proper Noun, singular |
| NNPS | Proper Noun, plural |
| PDT | Predeterminer |
| POS | Possessive Ending |
| PRP | Personal Pronoun |
| PRPS | Possessive Pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, past participle |
| VBP | Verb, non-$3^{rd}$ person singular present |
| VBZ | Verb, $3^{rd}$ person singular present |

The foregoing example tags are parts of speech that have been identified as particularly useful in processing natural language in typical written interpersonal communication. However, in the contexts contemplated herein, the user's communications are intended to be used in interaction with a computer; accordingly, the natural language that is used may tend to be more specialized. Accordingly, in these embodiments, a simpler set of parts of speech tags may be employed, as in the example of Table 5 below:

TABLE 5

Examples of parts of speech tags for use in interaction object processing

| Tag | Description |
| --- | --- |
| NN | Noun, singular or mass |
| NNS | Noun, plural |
| VB | Verb |
| ART | Article |
| PRN | Pronoun |
| ADJ | Adjective |
| ADV | Adverb |
| PRP | Preposition |
| CON | Conjunction |
| FRM | From |
| TO | To |
| AND | And |
| MY | My |
| WHT | What |
| HOW | How |

It may be noted from Table 5 that specific conjunctions, "What", "How", and "And", are specially tagged; "What" and "How" are also common interrogatives. The prepositions "From" and "To", and the possessive pronoun "My", which are likely common words in speech control of a computing device, are also specially tagged. In addition, specialized applications may benefit from specific tags assigned to special words, such as "Worksheet", "Row", "Column", "Sort", "Pivot", etc., in relation to a spreadsheet program.

The parts of speech present in the received text are thus tagged accordingly according to Table 5 or a similar scheme at 1025. It may be noted that the verbal input received in these examples may lack nouns. Consider the simple example of verbal input, "paint this rectangle red", accompanied by a non-verbal input selecting a particular element displayed by the computing device 100. In general, when the user utters a task instruction or communicates verbally with the computing device 100 in these examples, it is presumed that the subject of the statement is the computing device 100 itself (i.e., the computing device 100 is intended as the agent that will implement the instruction). Thus, in the case of "paint this rectangle red" or a variant "you paint this rectangle red", it is presumed that the subject is the computing device 100. In other words, for the interaction object to be correctly processed by the computing device 100, it is not necessary for the user to identify the intended agent for the instruction. Furthermore, the user may not use nouns to identify the objects intended to be acted upon. In the example of FIGS. 4A-4E, the verbal input was recognized as the phrase "copy color from here to here", with the noun "here" used to indicate an origin and destination; at the same time, the user provided non-verbal input identifying the origin and destination objects, so the word "here" or the phrase "from here to here" could have been omitted altogether. The word "here", when tagged as a noun, may be correlated to the objects already identified to the interaction processing thread.

Once the parts of speech are tagged, prepositions associated with the identified objects are identified at 1030; thus, "from" is associated with Object1 in the example of FIGS. 4A-4E, and "to" is associated with Object2. Verbs associated with the objects and prepositions are then identified at 1035; thus, "copy" is associated with Object1 and Object2 and with the prepositions "from" and "to". The (grammatical) object of the verb, which is the attribute "color" (a noun), is also associated with the identified verb.

At 1040, it is determined whether the verbs and available operations/methods for the associated objects correspond. For instance, the natural language method describing an available operation for Object1 and Object2 in the example of FIGS. 4A-4E may be expressed as "change color"; this does not literally match the user command of "copy" received in the recognized text. If there is no direct correspondence, then at 1045 possible synonyms for the received text are identified, and the language in the interaction object is "translated" according to the most suitable synonym to identify the required operation. The parameters and corresponding values for each identified object are then retrieved (for example, the "color" attributes of each object, and their corresponding values) at 1050. With the operation and corresponding parameters now identified, the interaction object is executed at 1055 by calling the identified operations using those parameters.

Synonyms and semantic similarities can be identified for verbal and non-verbal input alike. Consider the simple example of "paint this square red", mentioned above. The verb in this simple verbal instruction example "paint". However, the user could have selected a different verb, such as "color" ("color this square red"), "change" ("change this square to red"), or "fill" ("fill this square with red"). The interpretation of the interaction object is flexible enough so that object-specific synonyms are interpreted and executed consistently. To this end, the natural language processing carried out by the interaction processing module 220 refers to tables defining a probability of a word's membership in a part of speech, and a probability of similarity in meaning to other words. Example tables are illustrated in Tables 6 and 7 below:

TABLE 6

Example POS tag membership table
Part of Speech

Word
POS
Membership likelihood

TABLE 7

Example synonym table
Synonym

Word
Word Part of Speech
Synonym
Synonym Part of Speech
Similarity likelihood

The Part of Speech membership table of Table 6 defines words, parts of speech tags, and the likelihood (probability, expressible as a percentage) that the words belong to a given tag. The synonym table shown in Table 7 defines words, their part of speech; possible synonyms, and their part of speech; and the likelihood (again a probability, expressible as a percentage) that the word and corresponding synonym are likely to have identical meaning. These tables can be included in the natural language database referred to above that is used to provide the synonyms and semantic similarities to the interaction processing thread.

Disambiguation of Gesture Input

It will be appreciated by those skilled in the art from the above examples that the use of multimodal input reduces cognitive burden on the user, as it is no longer necessary to memorize a specific verbal instruction or command in order to achieve a certain response from the computing device 100. Instead, the computing device 100 can interpret the user's intention by constructing and executing an interaction object derived from both the verbal and non-verbal input. The use of multimodal input as envisioned herein similarly facilitates the use of gesture input.

Typically, gesture inputs (whether touch-based or otherwise) are "single-use" only, in that a particular gesture is associated with one particular function or action within a given application or operating system homescreen. Further complicating matters, a gesture in one application may yield a different result depending on a current state in the application, and on top of this, may yield a different result than the same gesture in another application. Thus, the user must memorize all these gestures and the conditions under which each may be performed. Consider, for example, an arcuate or circular motion on a touchscreen. The same gesture may have different effects depending on the application state: the gesture may be an input command to move a selected object in a drawing program along the arcuate path. On the other hand, the arcuate path may indicate a direction of rotation for a particular object or for the entire canvas. Yet again, the gesture might be used to pan the canvas along the path.

Figure 11A:
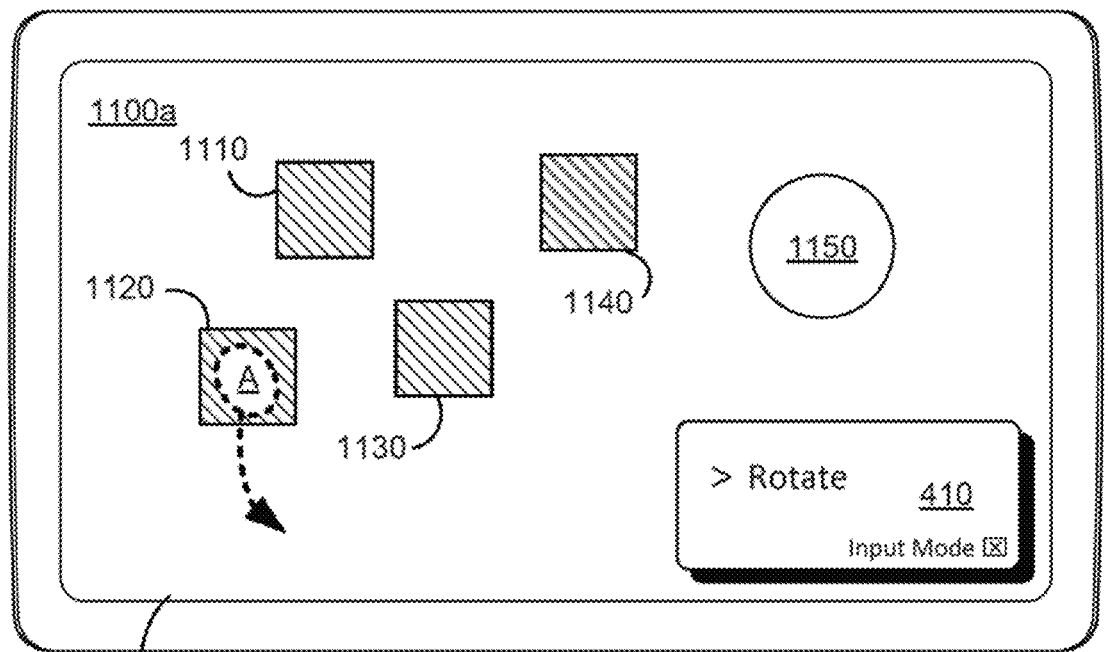
FIGS. 11A-11B, 12A-12B, 13A-13B, 14A-14B, 15A-15B, and 16A-16B are illustrations of example screens during the execution of multimodal input.
Figure 11B:
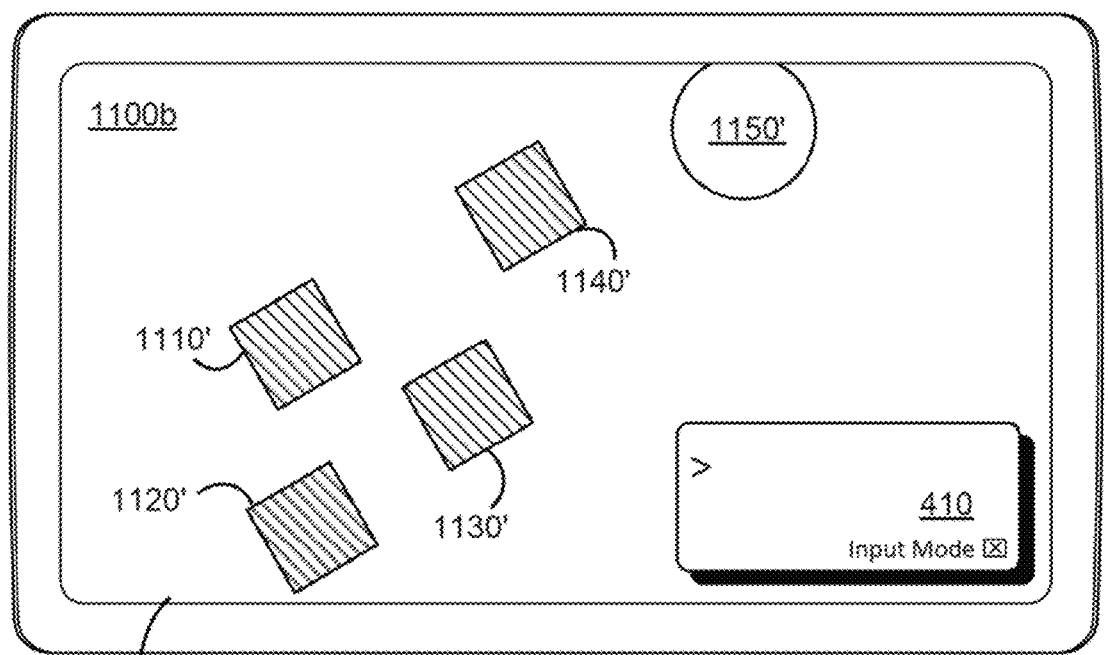

However, if the gesture forms part of multimodal input as described above, the concurrent verbal input can be used to disambiguate the gesture and determine to which of multiple actions the gestural input is directed. FIGS. 11A and 11B depict example screens 1100*a*, 1100*b* for a drawing or presentation program, with a different format of object display 410. In FIG. 11A, five graphic elements 1110, 1120, 1130, 1140 and 1150 are displayed. In this example, the user performs a touch gesture starting at touch point A, which coincides with element 1120. The gesture comprises a curved path downward from touch point A. In this example, while the user is performing the gesture, he or she also provides speech input to indicate the intended operation, here, "Rotate". The captured and recognized speech input is displayed in object display 410. The display of the recognized speech is provided for ease of reference; it will be appreciated by those skilled in the art that the object display may be omitted entirely, or that in some instances, the recognized speech may not be available while the gesture is being performed. FIG. 11B shows the resultant screen 1100*b* after the rotation operation is complete, and all five elements displayed on the screen have been rotated around a predefined center of rotation (e.g., the centre of the screen) to positions 1110', 1120', 1130', 1140', and 1150'. Referring back to FIG. 9, the gesture would be captured by the gesture overlay, and passed to the gesture recognition thread for processing; the object on which the gesture is intended to operate is determined by the touch point at the start of the gesture. In this case, it is possible that the element 1120 might be identified by the application view as the target of the gesture instead of all objects or the entire drawing layer as a whole. The determination of which object is intended to be the target may depend on the precise location of the touch point. For instance, an individual element may be selected for rotation only if the touch point A is located on the element at a point away from the element's center of rotation (e.g. its center).

Figure 12A:
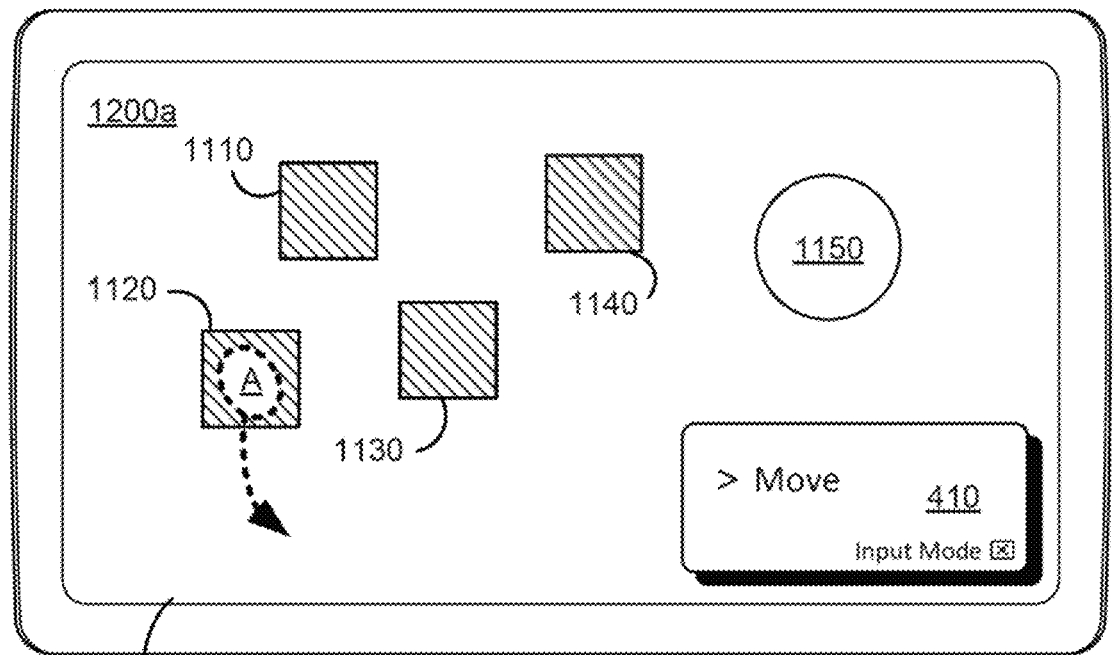
Figure 12B:
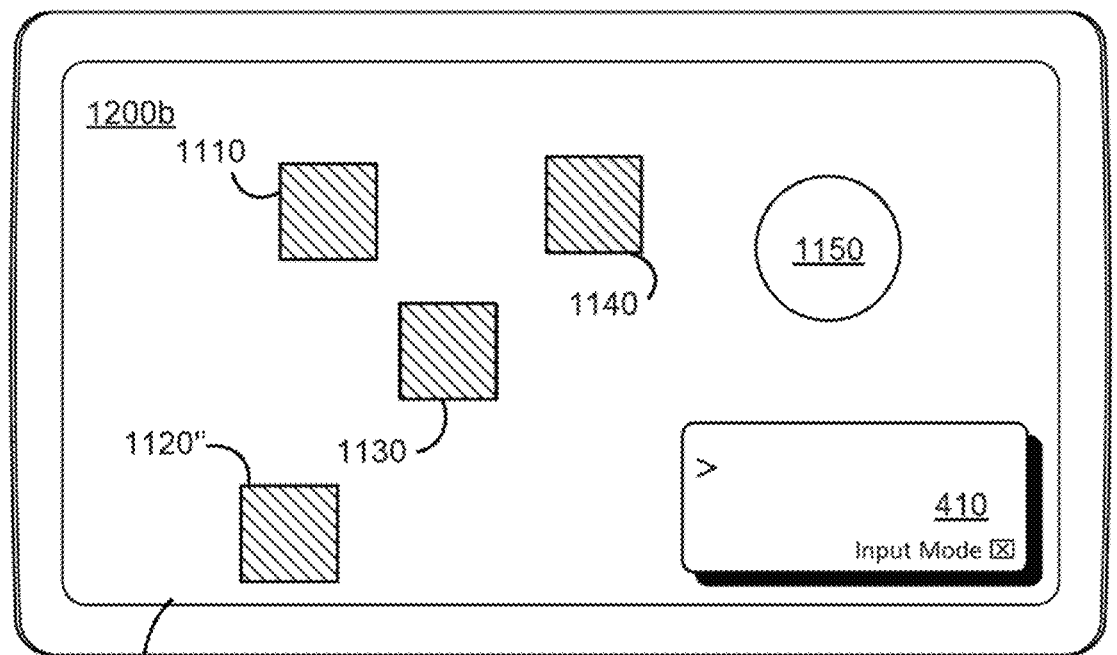
Figure 13A:
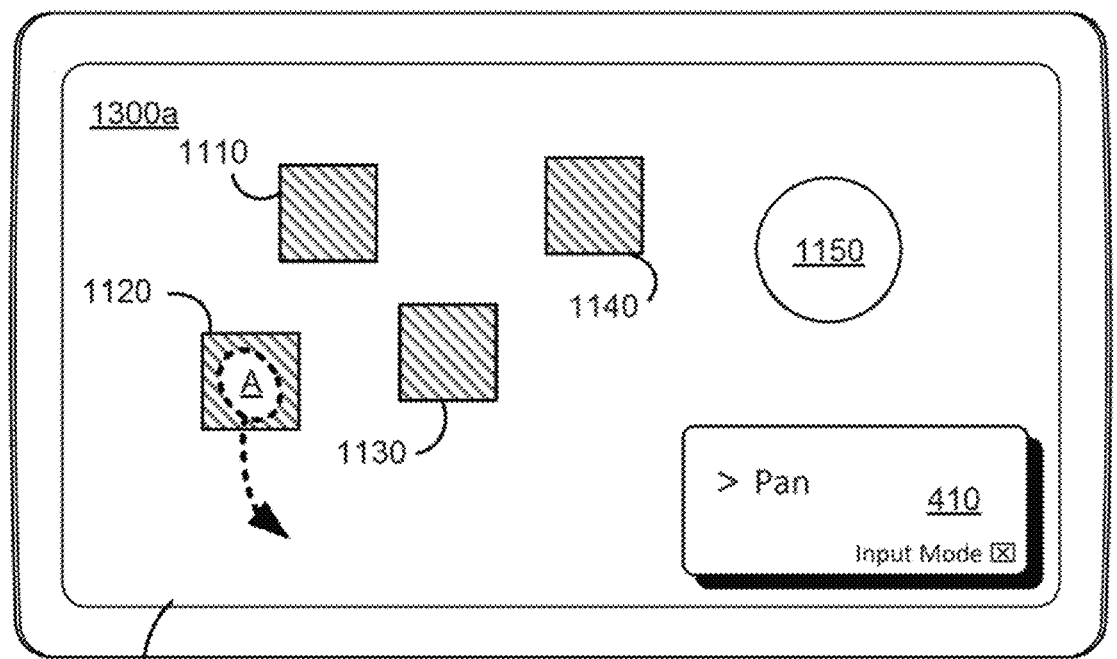
Figure 13B:
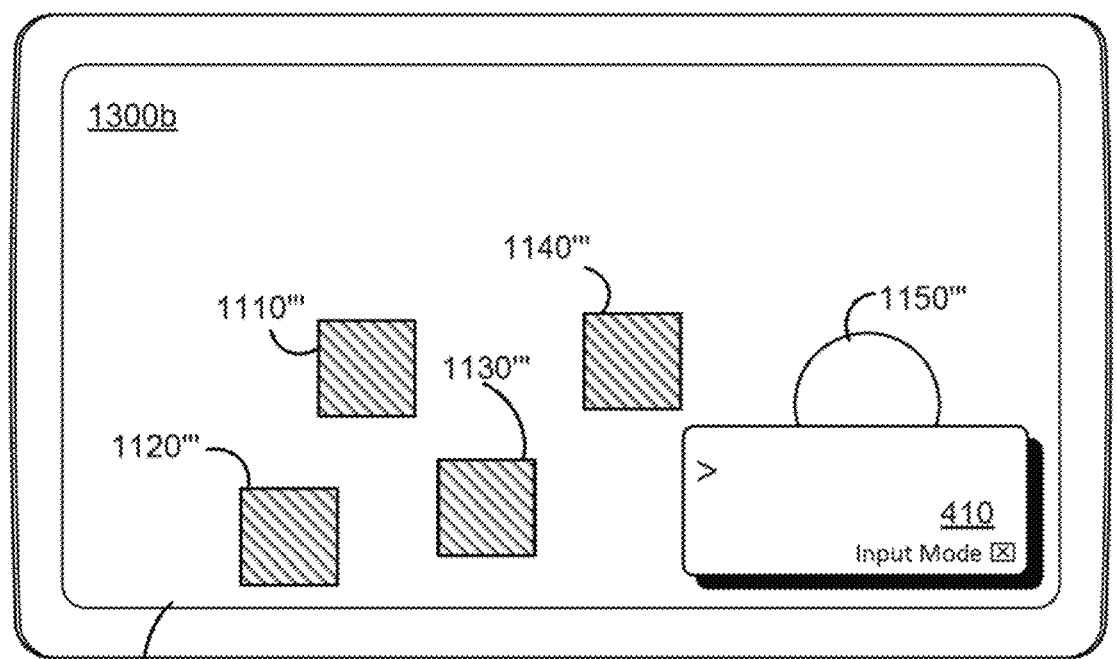

FIG. 12A depicts an example screen 1200a showing the same initial objects and gesture as FIG. 11A. In this example, the concurrent speech input is "Move" (depending on the existence of previously defined synonyms, the input could also be "Nudge", "Slide", etc.). The result of the operation is therefore a move operation applying only to the selected element 1120 to the new position 1120″ shown in screen 1200b of FIG. 12B. FIGS. 13A and 13B depict example screens 1300a, 1300b showing the same initial objects and the same gesture; however, in this case, the concurrent speech input is "Pan" (depending on the existence of previously defined synonyms, the input could also be "Scroll"). The result of the operation is therefore a pan or scroll action, where all five elements are moved to new positions 1110‴, 1120‴, 1130‴, 1140‴, and 1150‴.

Figure 14A:
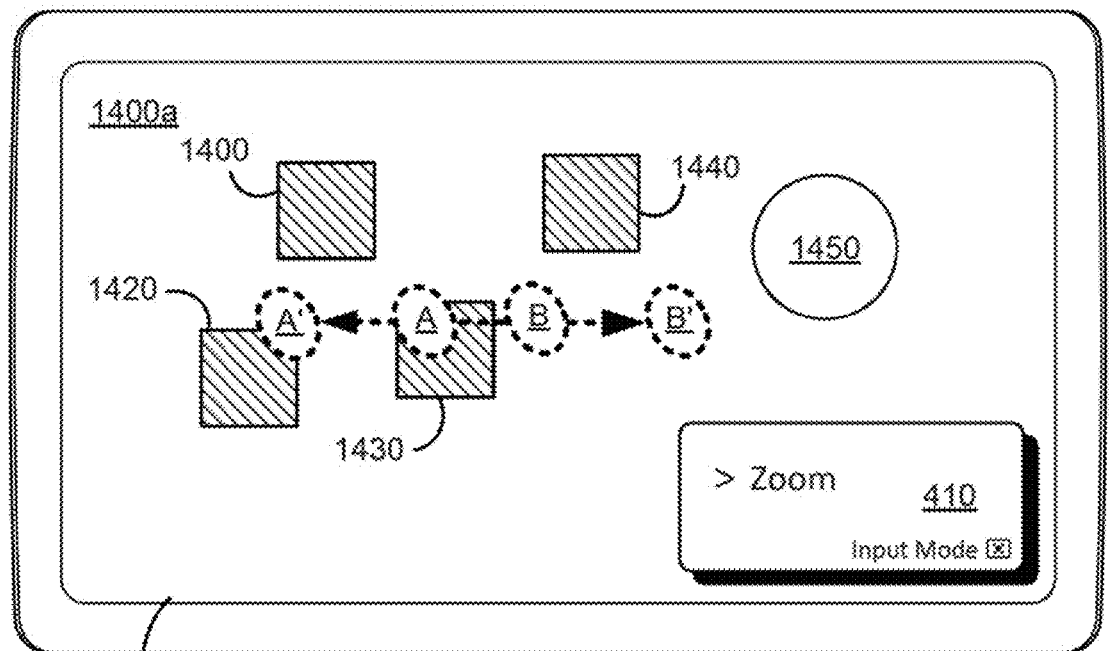
Figure 14B:
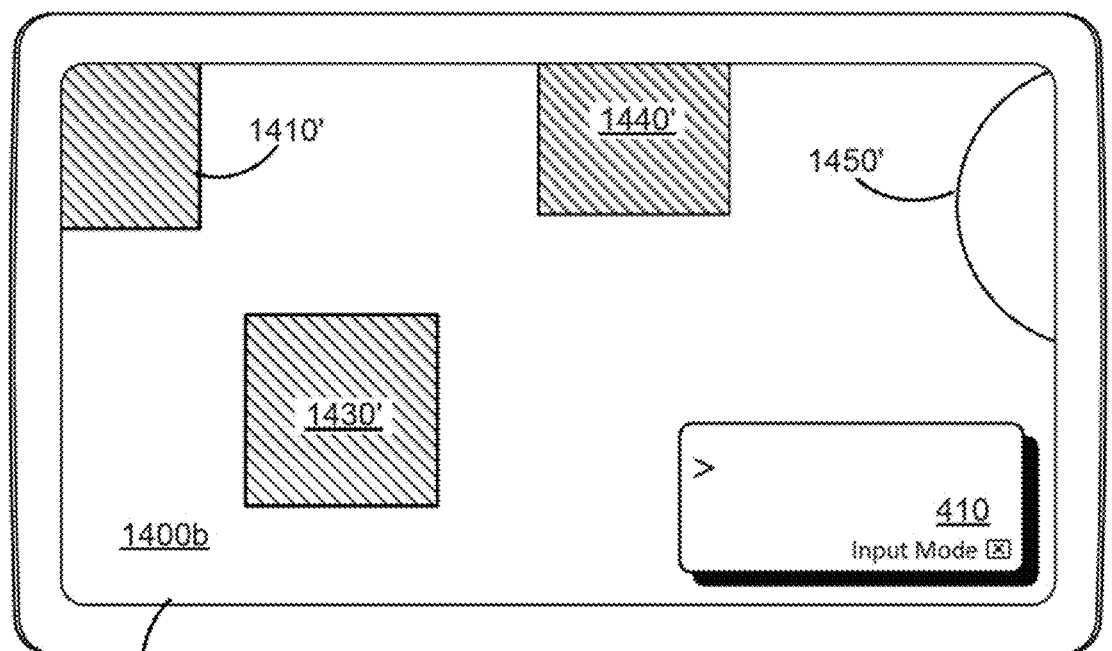
Figure 15A:
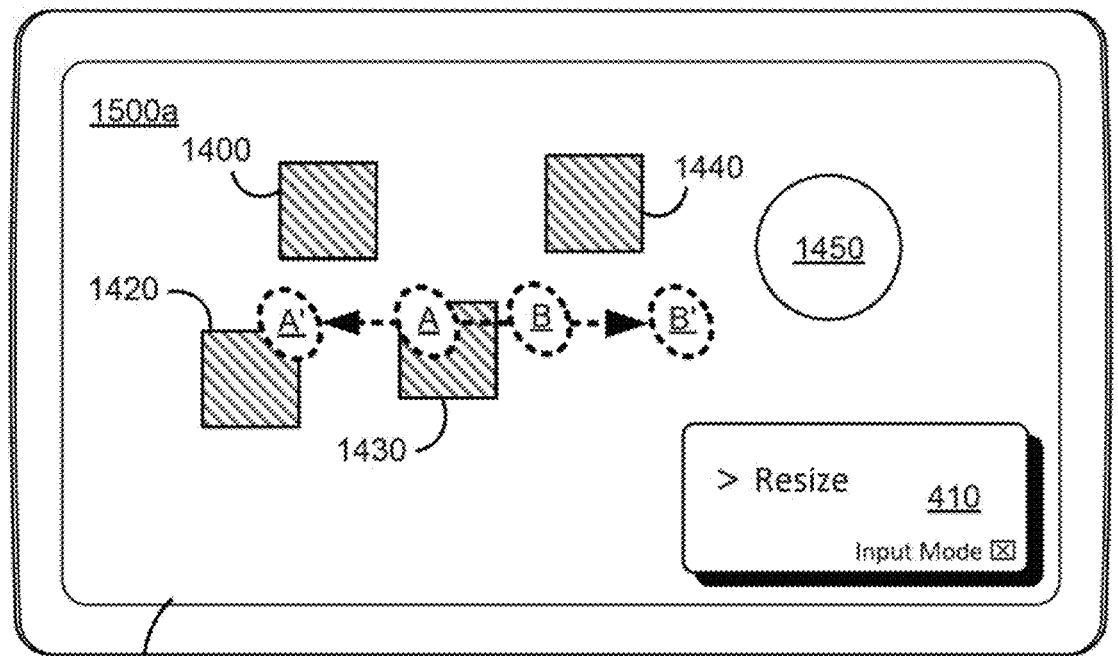
Figure 15B:
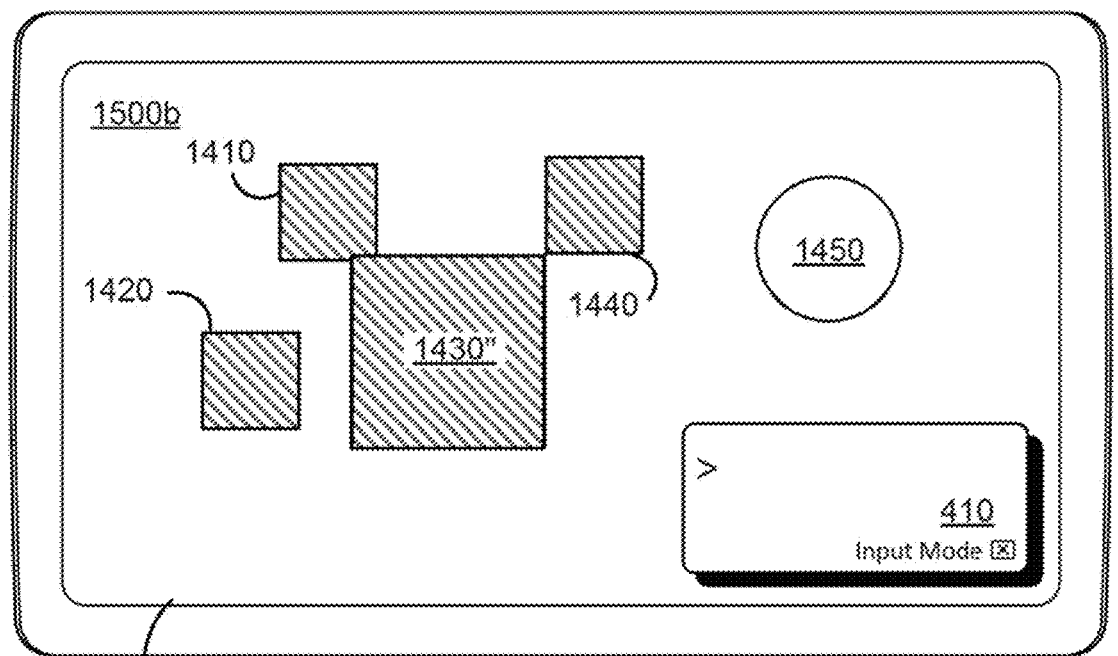
Figure 16A:
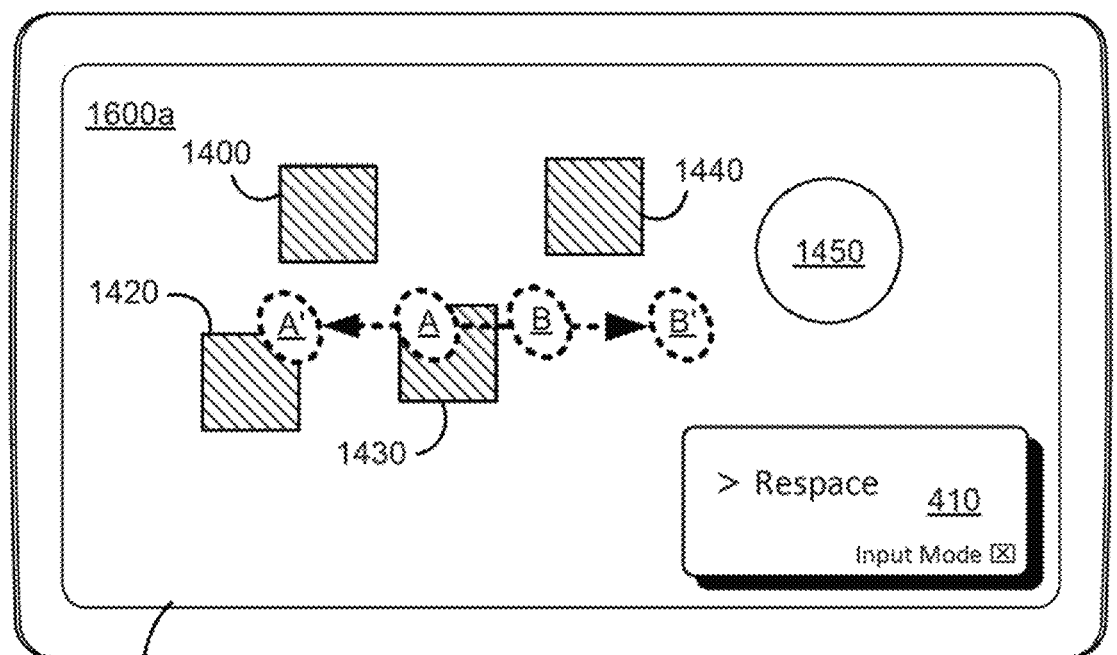
Figure 16B:
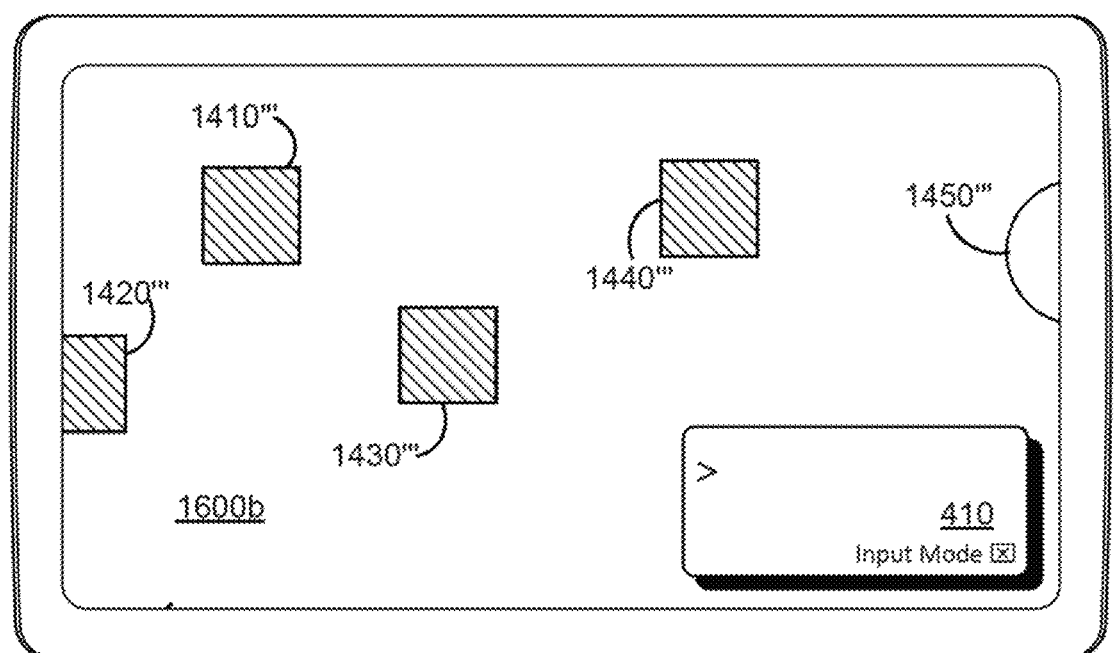

FIGS. 14A-16B illustrate the further example of the typical "pinch to zoom" touch gesture, in which the user places two fingers on the touchscreen and moves them together or apart in order to zoom out or in (i.e., decrease or increase magnification) on a displayed document. Again, this type of gesture is capable of supporting multiple interpretations. FIG. 14A illustrates the starting elements 1410, 1420, 1430, 1440 and 1450, and initial touch points A-B in screen 1400a. In this example, the user spreads his or her fingers apart while maintaining contact on the touchscreen to positions A'-B'. At or about the same time, the user provides "Zoom" as speech input (again, synonyms or similar statements may be used, such as "Magnify", "Enlarge", "Zoom in"). In response, the computing device 100 determines that the pinch gesture was intended to be a magnification command that generally applies to the document as a whole, and enlarges the displayed canvas, resulting in enlarged views of the elements, now 1410', 1430', 1440' and 1450', in screen 1400b in FIG. 14B. FIG. 15A shows screen 1500a in the same initial state as FIG. 14A; however, now the concurrent verbal instruction is "Resize". In this case, the object is identified as element 1430, which is the element closest to the middle of touch points A-B. As a result, in screen 1500b of FIG. 15B, that element alone is resized according to the scale determined from the final touch point positions A'-B' to updated element 1430″. Finally, FIG. 16A shows screen 1600a in the same initial state as FIG. 14A, but the concurrent verbal instruction is now "Respace". In this case, the object of the gesture is identified as all elements in the drawing canvas or layer, and the elements 1410-1450 are repositioned to 1410‴, 1420, 1430‴, 1440‴, and 1450‴ as shown in screen 1600b in FIG. 16B.

In a further example, if the computing device 100 is equipped with machine learning algorithms, the user's repeated use of a given gesture in association with a particular verbal command may "teach" the device 100 that this particular gesture implies the action associated with that particular verbal command, so that subsequent use of the gesture is interpreted as a command for that action without requiring the user to provide the accompanying verbal command.

Interaction with External Entities

The embodiments thus far have been illustrated with reference to entities local to the computing device 100, in the form of software objects. The above examples and embodiments may be applied to interaction with entities that exist or reside outside the device 100, such as remote software objects, local or remote physical objects, and services.

In the case of a software object defined locally at the computing device 100, the object can be represented in a visual instantiation as described above. When the entity exists outside the device 100, it may be similarly represented. However, unlike software objects of the type described in relation to FIGS. 4A-4E, the software constructs defining the attributes of these external entities are not necessarily created and presented during runtime in response to user instructions in the manner the software object may be created. Instead, the external entities may be discoverable by the computing device 100, and/or previously registered in a database or repository accessible to the computing device 100. In addition, properties of the external entities may be defined by a corresponding MetaObject in the same manner as software objects, above. Accordingly, these entities can be considered to be "objects" of various types (e.g. physical objects, service objects, remote software objects).

Figure 17A:
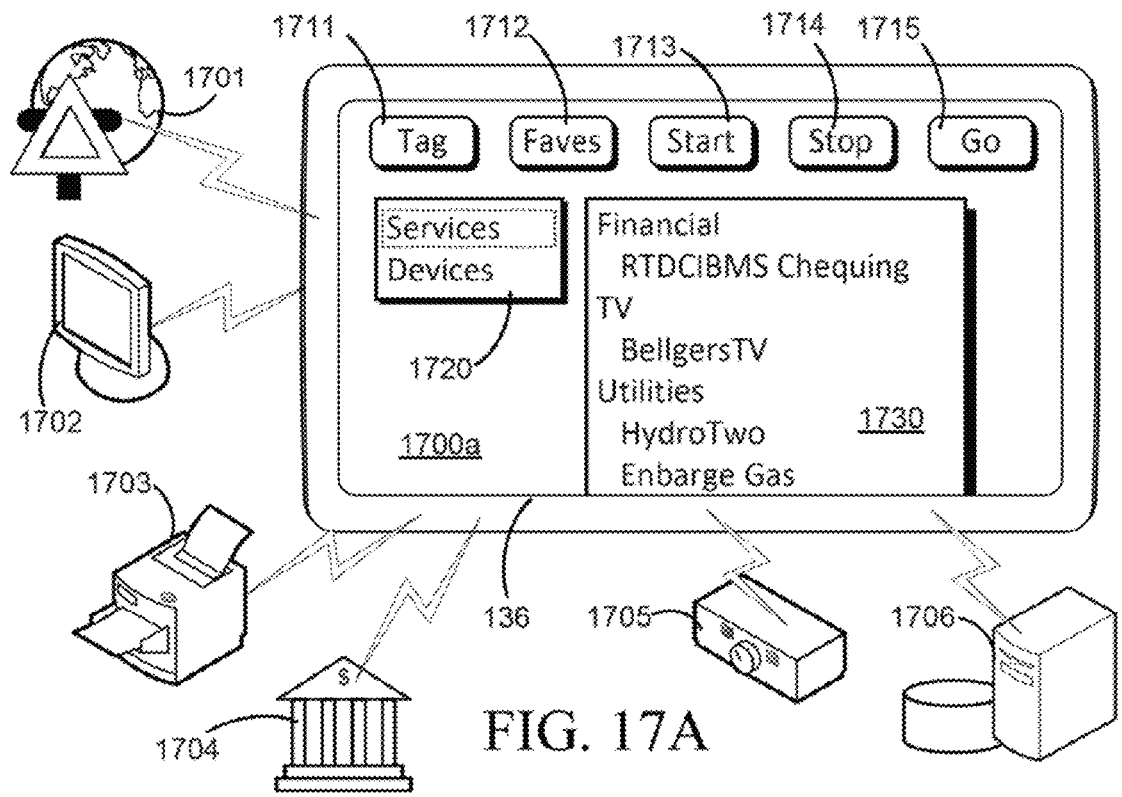
FIGS. 17A-17B are illustrations of example screens depicting interaction with registered services and devices.

Previously registered objects may be presented to the user for selection by non-verbal means (e.g., by a pointing, touch, kinetic, etc. UI). FIG. 17A depicts an example graphical user interface 1700a that can present objects of different types to the user. Icons 1701-1706 represent various genres of external objects available for interaction at the computing device 100. These external objects can include web services 1701; local physical devices of various types 1702, 1705; remote physical devices (e.g., accessible over a network) 1703; accounts and services provided by other entities 1704, 1706, such as bank accounts, utilities, and content services such as television. The various services and devices can be presented in any suitable manner. In the screen 1700a, the user can invoke a display of available services and devices by activating a favorites button 1712, or by some other command. The screen 1700a shows that the user is able to select either "Services" or "Devices" from a menu system 1720; selection of one of these options presents a list of available objects 1730 identified by name. In the example of FIG. 17A, a list of services is provided, sorted according to genre. The screen 1711 also provides other control buttons, including a button for a tag function 1711, discussed below, and Start 1713, Stop 1714, and Go (execute) 1715 buttons, which function in a manner similar to that described above in connection with FIGS. 4A-4E.

Figure 17B:
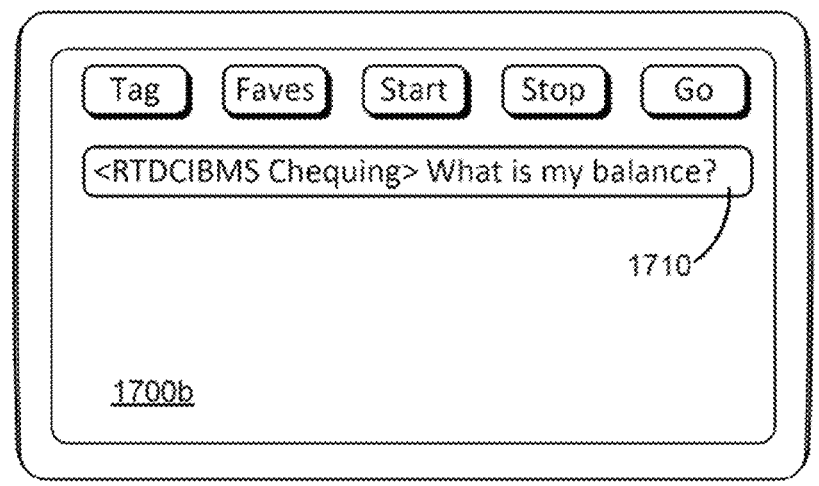

Once the user selects a listed service or device, he or she can then provide verbal input in text or speech form in a manner similar to that described above. Thus, in screen 1700b in FIG. 17B, the user has selected a service, a chequing account, and has asked "What is my balance?" An object display 1710 is shown in screen 1700b, echoing back the selected object ("<RTDCIBMS Chequing>") and the recognized text. Processing of this non-verbal and verbal input proceeds generally as described above, although in this case the identified object is associated with an address and defined operations for making, for example, API calls over a communication interface to a remote service to perform the operation interpreted from the verbal input. Remote software objects and physical objects may be handled in a manner similar to services, in that these entities are associated with an address, and the computing device 100 will communicate with the target software object or physical object over a fixed or wireless communication interface. Typical operations invoked by the user can include status queries (e.g., inquiring about a balance or usage quota), control (e.g., turning on or off a physical device or system such as an HVAC system, starting a vehicle engine, or changing channels or tracks on an entertainment system), or transactions (e.g., transferring funds from one account to another).

Purely verbal input may be provided by the user when attempting to interact with an entity. For instance, the user may instead provide a verbal query such as "What is my chequing account balance?" rather than first selecting the appropriate service then speaking a query. The interaction processing module 220 may still construct an interaction object for execution, but rather than relying on non-verbal input from the user to select the target object, the interaction processing module 220 uses the text recognized from the verbal query to identify a named entity from the registered ("favorite") entities. When the recognized text is tagged with parts of speech, the possessive pronoun "my" is recognized as a cue that an entity may be identified by the following name or noun. Accordingly, the interaction processing module attempts to match part of the recognized text to an existing entity registered at the computing device 100. If a match is found, the interaction processing module 220 can then retrieve object information for that matched entity and embed it in the interaction object. If a match is not found, a synonym and semantic similarities lookup may be performed as described above. For example, "HVAC" may be name of a registered entity, but the user may refer to it as a "my heater" or "my air conditioner" in a verbal query. Any available synonyms are stored in the natural language database 235 as described above. Alternatively or additionally, if a match or synonym is not found, a general Internet search may be carried out, or the user may be notified that the entity was not recognized.

Nearby physical objects can be the subject of proximate interaction. In proximate interaction, physical objects in the proximity of the user and computing device 100 can be easily identified to the computing device 100 using a variety of means. A physical object can be considered proximate if it is located within the device's range of immediate perception—for instance, within range of the device 100 for communication using a relatively short-distance wireless communication protocol (e.g., NFC, Bluetooth™, Infrared, or Wi-Fi™); within range of a device camera or scanner for scanning a bar code or QR code affixed to the physical object; within range of a device camera for taking a picture for use in image recognition; or within the range of a device microphone. Examples of proximate physical objects can include any type of object capable of responding to queries or providing access to status or configuration information, including but not limited to office machines such as printers, facsimiles, photocopiers, and the like; networking equipment; home alarm systems; HVACs; smart energy devices; televisions and other audio/video equipment; vehicles; and so on. These physical objects may be registered with the computing device 100 as described above, and therefore may be interacted with via the address associated with the object as described above, but proximate objects can be discovered by the computing device 100 without prior registration in the object repository 230.

Figure 18A:
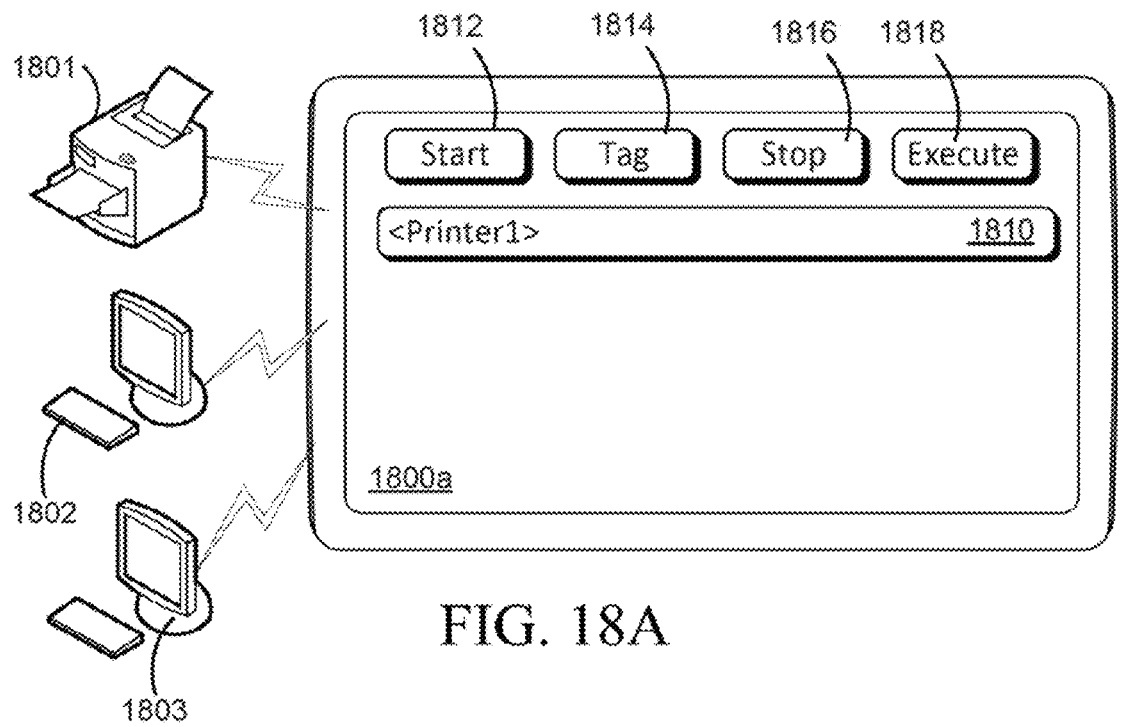
FIGS. 18A-18D are illustrations of example screens depicting interaction with a discovered physical object.
Figure 18B:
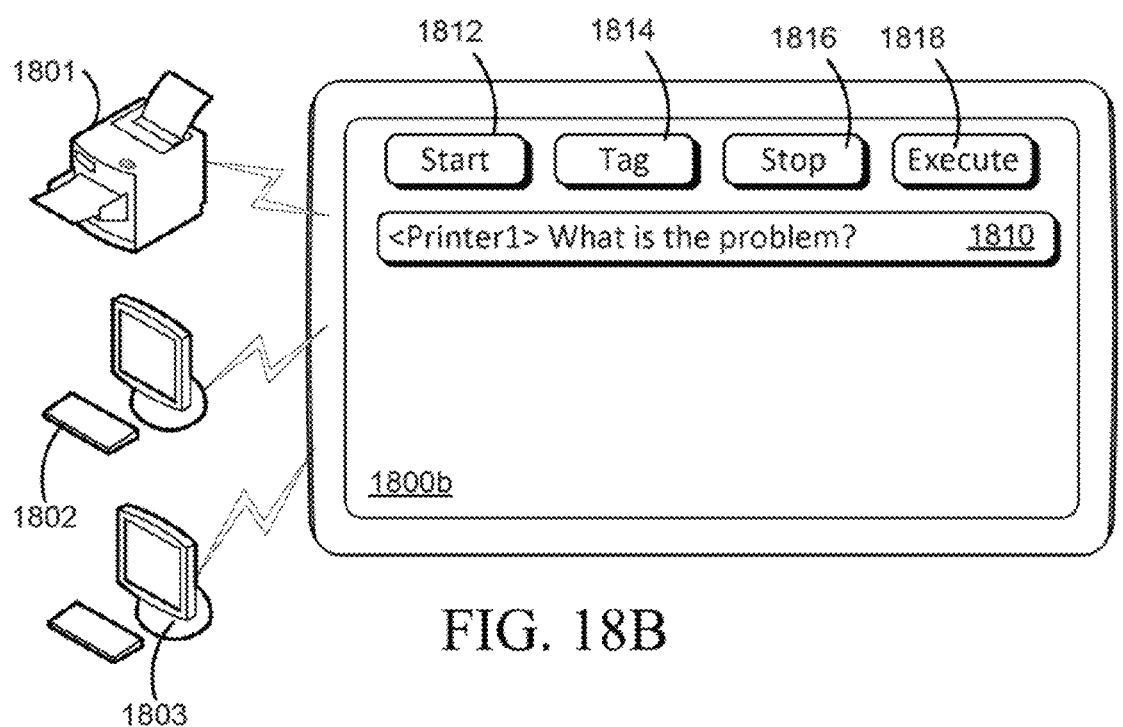
Figure 18C:
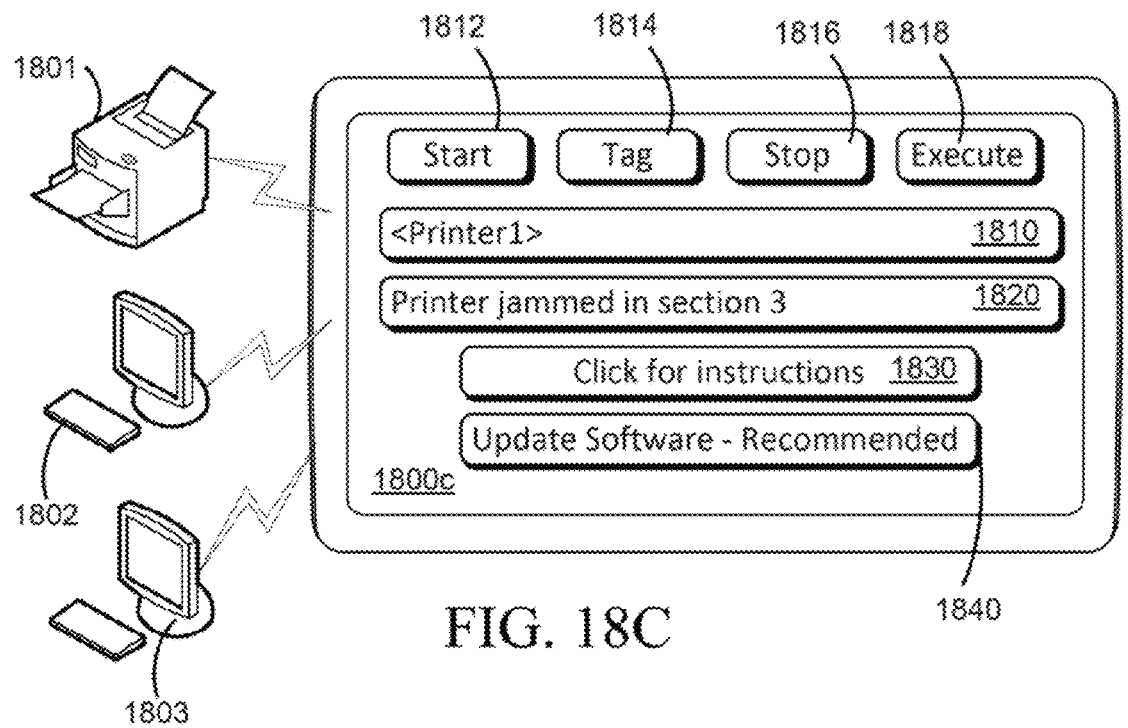
Figure 18D:
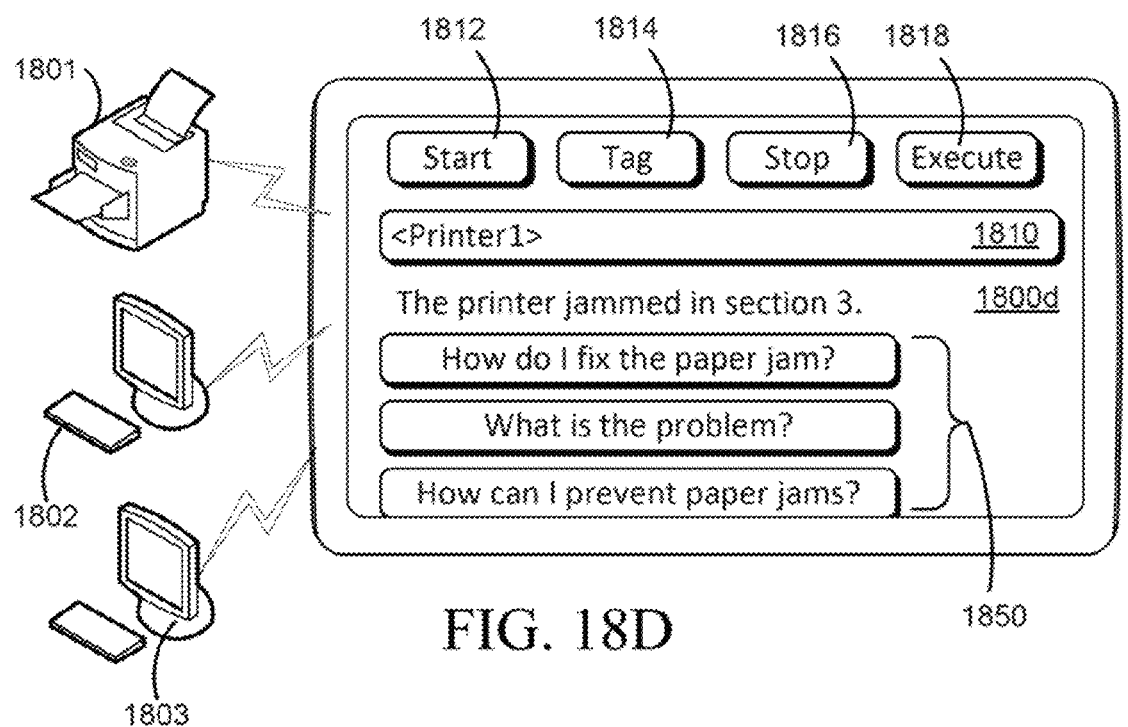

FIGS. 18A-18C illustrate an example of interaction with a physical object such as a printer using multimodal input at a computing device 100. FIG. 18A illustrates a set of physical devices, such as printers 1801 and personal computers 1802, 1803, that are within short-distance communication range or perceptual range of the computing device 100. Each physical object may be provided with a QR code or other machine-readable indicia (whether visual, RF, etc.) that can be detected by a sensor or other input mechanism of the computing device 100. Each such physical object is assigned an identifier, which may be represented by the machine-readable indicia, or broadcast by the object in a discovery mode such that it can be detected by the computing device 100. In further implementations, the identifier may not be physically affixed or generated by the physical object; instead the physical object may be recognizable by the computing device 100 using image recognition algorithms based on recorded images of the object.

FIG. 18A depicts an example screen 1800a for use in interacting with the printer 1801, including an object display 1810 similar to that shown in FIGS. 4A-4F, and control buttons 1812, 1814, 1816 and 1818. The user commences interaction by activating the "Start" button 1812, generally as described above; again, as noted above, it is not necessary for the user to explicitly invoke an input mode on the computing device 100. In this example, the user may provide speech input as well as non-verbal input in the form of physical object identification by scanning the object's QR code (or reading whatever other indicia is provided for the physical object). Input of the physical object's indicia is initiated by the user activating the "Tag" button 1814. When the user activates the button 1814, the computing device 100 may check for any discoverable physical devices in the proximity, then provide the user with a selection of these devices. On selection of the desired physical device on the computing device 100, the object display 1810 can then be updated to reflect the selection of the printer as shown in FIG. 18A ("<Printer1>"). The user can then provide verbal input (speaking "What is the problem" in this example), which is echoed back in the object display 1810 as shown in screen 1800b of FIG. 18B.

On completion of input, the user can activate the "Execute" button 1818, at which point the computing device 100 constructs an interaction object for execution as described above; however, in this case, the referenced object is a physical object. The interaction object is interpreted and executed. During execution, the computing device 100 communicates with the printer to identify a status—for example, that the printer is jammed in a particular section—and to determine possible options to present to the user. In some examples, the computing device 100 may be provided with an expert system to enable the user to troubleshoot the identified problem. An example response is shown in FIG. 18C, in which a response 1820 is provided, together with a set of possible actions for the user to take to address the problem or related issues 1830, 1840.

It will again be appreciated that explicit user instructions to "tag", "start", or "execute" are not necessary. For example, the computing device 100 may be configured to automatically detect proximate physical objects and present them for selection; upon selection of one of these objects, automatically enter a speech input mode; and/or upon detecting an end to verbal input (e.g. due to a pause in input), automatically begin processing the verbal and non-verbal input.

Error Correction and Rapid Selection

The computing device 100 can be configured to carry out spelling and grammar checking on verbal input prior to constructing the interaction object, to identify and correct typographical errors (in text received via a text UI) and grammatical issues that may create ambiguities (e.g. a reference to "this" object when the user has selected multiple objects). It will be appreciated, though, that where multimodal input is used and non-verbal input is used to select objects for interaction, the likelihood of error in the interpreted input overall may be reduced since it may be presumed that the user's selection of the object is accurate.

Speech and handwriting recognition are error-prone, whether due to background noise (in the case of speech), the user's ability to express him- or herself clearly either orally or in handwriting, or the limitations of the recognition algorithms available on the computing device 100. Errors may be manifested by incorrect or incomplete text recognition, as in the example of FIG. 4F, above. When the verbal input is echoed back as in the object display 410, the user can select some or all of the echoed input—including objects identified by non-verbal input—and directly edit the selected content. Thus, in the example of FIG. 4F, the user may select the incorrect word "coffee" and replace it with the correct word "copy" by typing the correct letters. The selection may be carried out using any suitable input mechanism, such as a pointing, text or touch UI. Correction may even be carried out using the same input interface used originally (e.g., the speech UI), by the user selecting the words or letters to be replaced and speaking the correct word or letters. In the case of a touch UI, gestures may be conveniently used to quickly carry out editing acts when the user seeks to edit or correct content. For example, in addition to typical touch-based gestures to select a letter or string of letters, a downward swipe over a single letter may be interpreted as a command to erase that single letter; a backward swipe (i.e., in the direction opposite to reading) starting at the end of a word may be interpreted as a command to delete that word; an upward swipe in a line of text may be interpreted as a command to insert a space after the starting point of the swipe and optionally to position the cursor or insertion point after that space; and a forward swipe in a line of text (i.e., in the direction of reading) may be interpreted as a command to insert two spaces after the starting point, and position the cursor or insertion point in the middle of these two spaces to permit the user to input a new word.

The computing device 100 accordingly captures the corrected content and replaces the identified erroneous content, and the corrected content is provided to the interaction processing module 220 for constructing or updating the interaction object. However, alternatively or in addition to capturing a correction from the user in the above manner, the computing device 100 may provide correction options by a rapid selection mechanism. As one example, when text content recognized from speech input is selected in the object display, the computing device 100 may attempt to re-recognize the detected speech (which is temporarily stored, as mentioned above) to identify a next-best match, and present that as an option for selection by the user.

As another example, objects identified by the user's non-verbal input can be used to determine the best or N-best options for recognizing the speech, as alluded to above in relation to FIG. 9. For instance, if it is determined that the N-best options for a portion of recorded speech are "coffee", "copy", and "coughing", the MetaObject or object information associated with the identified objects proximate to the detected speech (e.g., the object immediately following the speech, or the object identified by a gesture concurrent with the speech, or any object that is identified during the multimodal input) can be used to predict which of the N-best options is the likeliest option by comparing the natural language-expressed methods associated with the object, and their synonyms, to the N-best options to identify a match. The matched option is the likeliest one.

If the computing device 100 is provided with machine learning algorithms, the correction, once completed, may be used to improve the ASR algorithms or associated data stores when an existing word (i.e., a word that is known in the natural language database 235) is not correctly recognized; update a synonym table when a word relating to an object has was not previously recognized as a synonym; update the natural language database with a new word that is identified by an external source, such as an Internet accessible dictionary; or associate an existing word with an operation. Further, corrections may be provided to a central location for use in developing improvements to speech recognition and natural language processing algorithms, which may then be distributed to or made available to all computing devices 100.

A similar prediction method may be used to provide the user with options to rapidly select content (e.g. a text, object, option, etc.) outside the scope of error correction. Given the prior identification of an object, information concerning that object from the object repository 230 can be used to determine N-best options for completing user-input text or commands. As the user inputs a string of letters via a text UI, the computing device 100 can present one or N-best options determined to be the likeliest matches between the input string and object-related methods or attributes so that the user can select the best option to automatically complete the input text. For example, if the user had already selected an object for interaction, such as the object 450 in FIG. 4A, the user might begin entering the letters "co" via a text UI. The computing device 100 may compare that string to the methods or attributes associated with the object and find that the string matches the operation "copy" and the attribute "color". The device 100 may then present one or both of these as options to automatically complete the input text.

Similarly, the computing device 100 can facilitate complex tasks to be performed by the user. Consider the case where the user needs to organize a meeting: the availability of the attendees needs to be checked so that a suitable time can be chosen; the invitations need to be sent to attendees, and added to the user's calendar; a meeting location needs to be identified and reserved; the attendees' responses need to be tracked, and reminders sent if responses are not received; refreshments need to be ordered. Thus, when the user indicates a goal of organizing a meeting by providing the verbal input "book a meeting" (or similar language), the computing device 100 can match this verbal input to likeliest objects based on MetaObject information and synonyms/semantic similarities. The word "meeting" may be determined to be a possible synonym for a calendar event; thus, the computing device will determine a set of prompts for some or all of the above tasks based on the MetaObject information corresponding to calendar events.

Macros and Buffering

The embodiments above permit the buffering of user input for sequential interpretation and execution, and the creation of macros for subsequent execution. The elements in an interaction object can be combined to produce a macro or script much in the same way that macros for existing productivity applications or shell scripts are created. The multimodal inputs from a user may be recorded, then stored for later execution. Consider the case where a spreadsheet of wireless usage data is received for all users in an organization, and it is desired to construct individual user reports. Table 8 illustrates a possible macro employing software objects, where a new file is created:

TABLE 8

Example macro containing objects

Start
Open file "MonthlyUsageReport"
Pivot by <UserName>, <Service> and <Feature>
Summarize <Charges> by <Feature>, <Service> and <UserName>
Save as file "MonthlyBillingSummary"
End More complex macros may be created to interact with multiple files, such as the example in Table 9 below:

TABLE 9

Example complex macro

Start
Prompt user for "Month = " $Month "Year =" $Year
Create XLS file UsageReport$Month$Year
Open XLS files with names DailySummary$Year$Month*
  If first file
    Pivot by <UserName>, <Service> and <Feature>
    Summarize <Charges> by <UserName>, <Service> and <Feature>
    Add output to UsageReport$Month$Year
  If not first file
    Pivot by <UserName>, <Service> and <Feature>
    Summarize <Charges> by <UserName>, <Service> and <Feature>
    If the <UserName>, <Service> and <Feature> is new in UsageReport$Month$Year append row with <Service> and <Feature>
    Update value by adding <Usage>
End The above example employs user-defined variables (e.g., "Month"), system input ("DailySummary$Year$Month*"), wildcards ("*"), and outputs data to identified systems ("UsageReport$Month$Year").

It will be appreciated by those skilled in the art that the method of multimodal input and construction of the interaction object, described above, facilitates the "buffering" of input instructions, permitting the user to bundle together multiple instructions in a single instance of multimodal input.

Figure 19A:
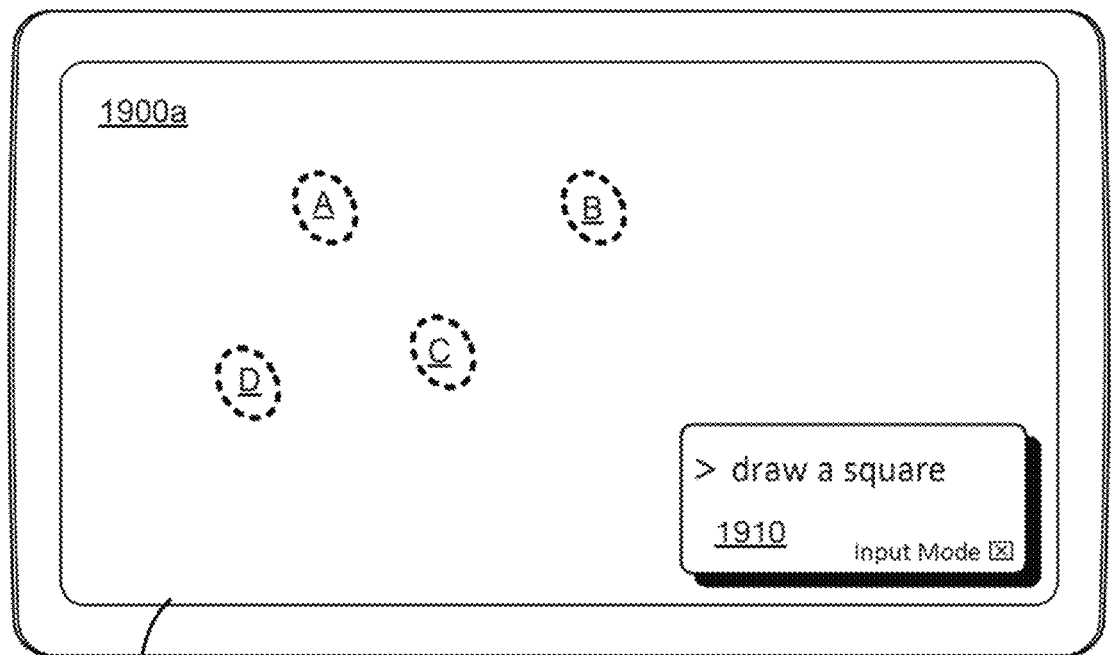
FIGS. 19A-19C are illustrations of example screens depicting execution of buffered input.
Figure 19B:
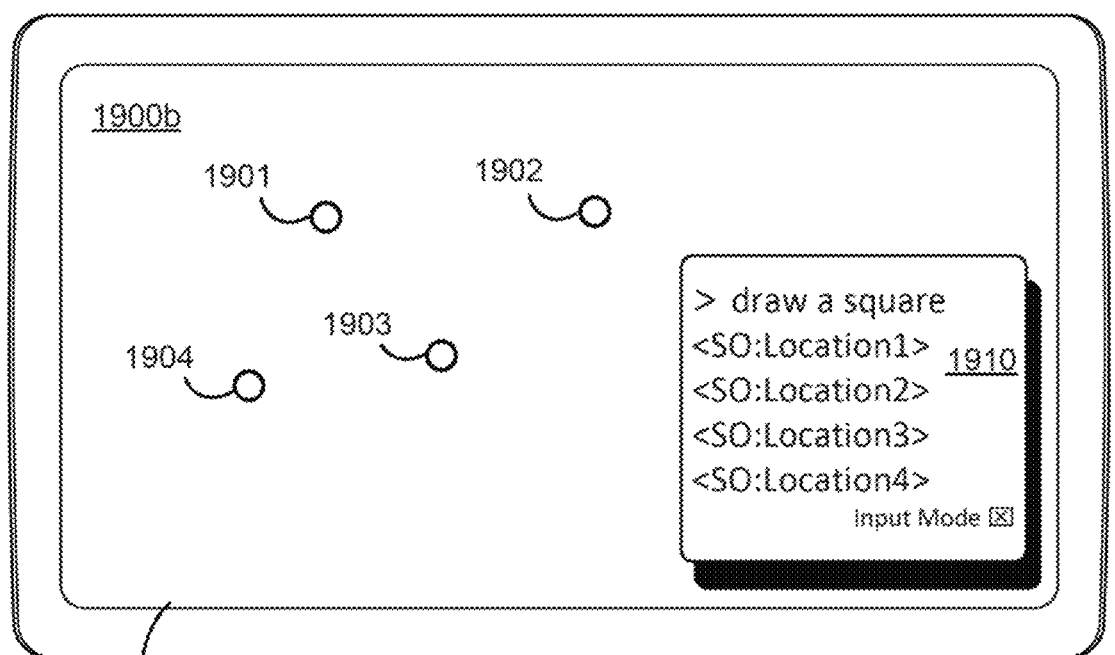
Figure 19C:
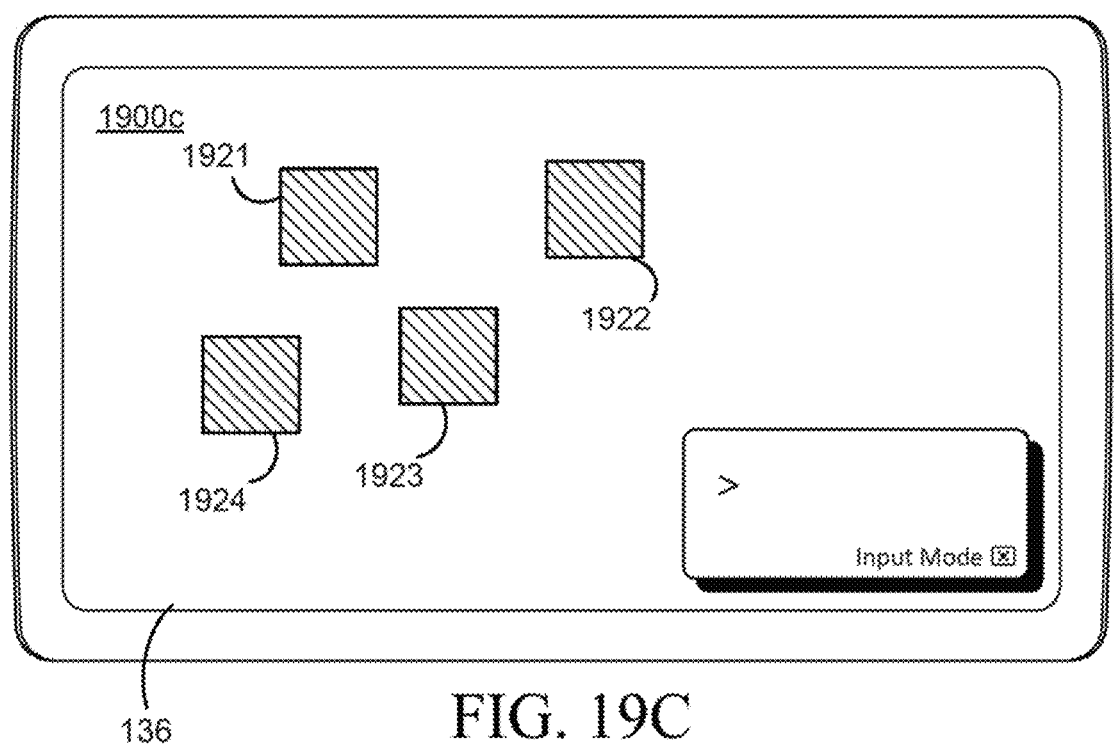

FIGS. 19A-19D illustrate an example of buffered instructions in relation to software objects, again in the case of a drawing or presentation application. FIG. 19A depicts a first screen 1900a of the application executing on a touchscreen device in an input mode, again with an object display 1910. In this instance, the canvas displayed on the screen 1900a is empty. The user provides the verbal instruction, "draw a square", and touches the touchscreen display 136 at four points, as indicated by touch points A, B, C, and D. In response to these touches, the device 100 identifies four objects, here locations, on the canvas. This is reflected by the updated object display 1910 on screen 1900b in FIG. 19B, which reflects the input verbal command, and four instances of objects identified by the non-verbal input. Optionally, as can be seen on screen 1900b, the identified locations may be visually indicated on screen, in this case by indicia 1901, 1902, 1903, 1904. On completion of the input, the multimodal input is interpreted and processed as described above, and the result output as shown on screen 1900c of FIG. 19C, with squares 1921, 1922, 1923, 1924 drawn at the touch points. In a further example, when the verbal input is processed prior to completion of the multimodal input, the screen may be updated to visually indicate the expected output from the input received to date; for example, outlines of squares at the four touch points may be shown in phantom.

Similarly, sequential tasks to be carried out by the computing device 100 may be input verbally by the user prior to execution. Consider the example where the user wishes to download and install an application on the computing device 100. The process may involve downloading a zipped file of the application; copying the file to the desktop; unzipping the file; copying the unzipped file to the destination directory; pasting a shortcut to the desktop; and deleting the unneeded files. In a typical current graphical UI-based environment, each step in the process must be completed before the next is carried out. However, the embodiments provided here decouple these actions from the graphical representations of the objects involved (the zipped file, unzipped file, and shortcut), permitting the user to provide a set of verbal commands (e.g., "download [filename]; copy the file to the desktop; unzip the file; copy the unzipped file to [destination]; create shortcut to the unzipped file on the desktop; delete zipped file"). The verbal commands are then processed into separate interaction objects in the sequence in which they were received, and each subsequent interaction object takes as its target object an object that was identified by the previously executed instruction.

Collaboration and Playback

It will be appreciated from the foregoing examples that the interaction object is, effectively, an encapsulation of a sequence of instructions or input content that that is "portable"; i.e., capable of being provided to another device configured to interpret and execute.

For example, interaction objects can be shared between two or more computing devices 100 in a collaborative session. A collaborative application is launched on each participating device 100, and a collaboration session is established between the devices. Data may be passed between the devices according to any suitable proprietary or open protocol. Each user may provide multimodal input to their respective device 100; each device 100 generates an interaction object, and interprets and executes that object while also transmitting the interaction object to the other participating devices 100. The other devices 100, on receipt of the interaction object, can then interpret and execute the object. In this manner, multiple users may work on a single document, and updates to the objects contained in the document are packaged as interaction objections and shared. The order of execution of interaction objects generated and received at a given device may be governed by known data synchronization techniques to ensure that collisions or inconsistences are avoided.

The interaction object may also include content other than text and object. For example, media files (e.g., recorded speech, video, images, etc.) or documents (either proprietary or open standard) may be embedded in the interaction objects as well as interpreted gesture and text content. The interaction object can then be stored for later playback, or transmitted to a recipient using known file transfer and messaging techniques (e.g., SMS, MMS, email, instant messaging) for playback at a remote device. Playback may be carried out synchronously or asynchronously. In synchronous playback, time-based media files (e.g., recorded speech) is played back as the remaining content of the interaction object is executed. In asynchronous playback, the playback and execution are carried out sequentially.

Split-Screen Interactions and Linking

Figure 20:
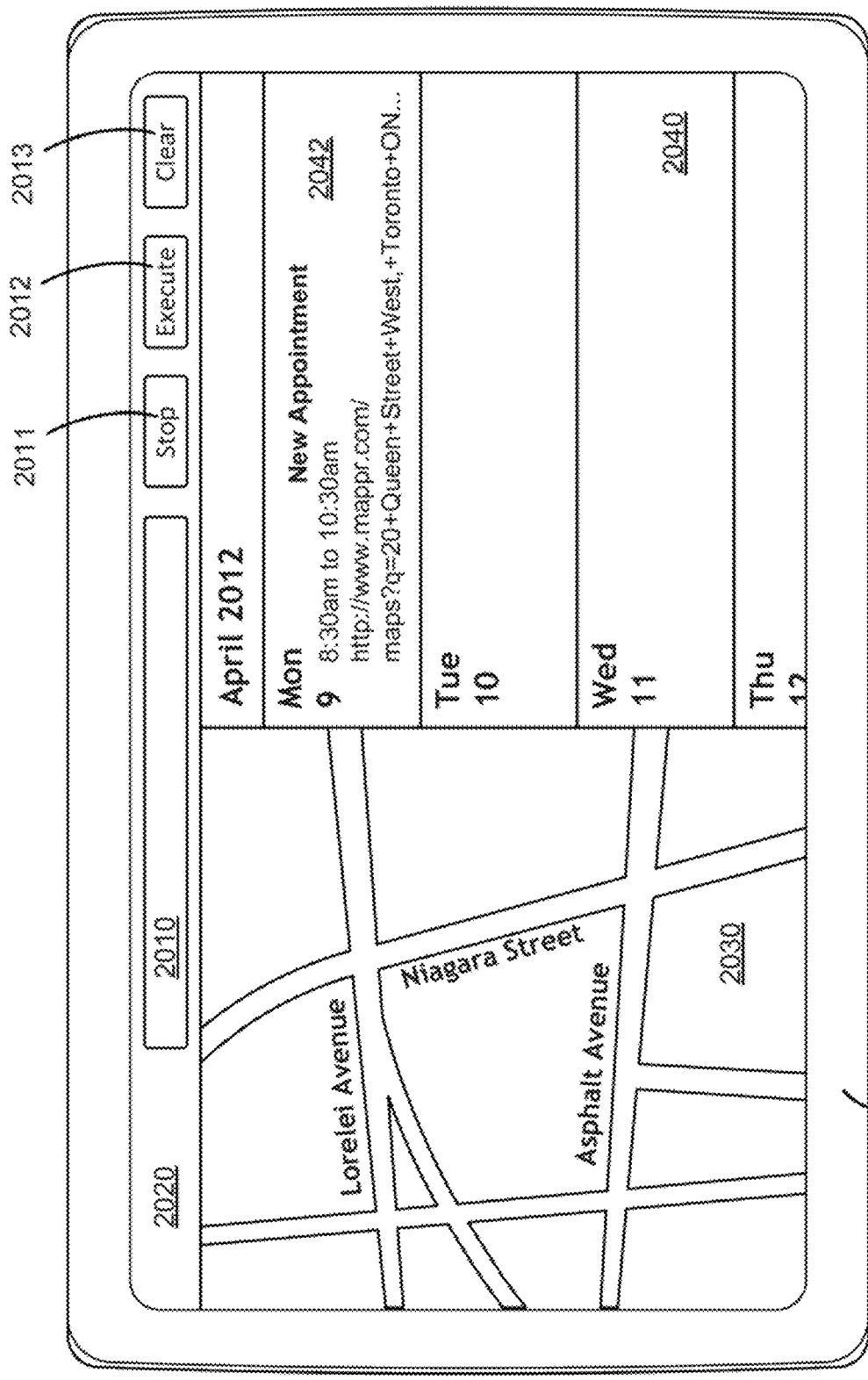
FIG. 20 is an illustration of an example screen depicting a split application view.

The above examples can be used to facilitate interaction between applications executing on the computing device 100. For example, the device 100 may execute applications in a windowed or split-screen mode, and objects selected from one application may be linked to another. FIG. 20 illustrates an example in which the screen 2000 has been vertically split into two panes 2030, 2040. The screen 2000 may be divided into panes in response to a "split" command (which may be a spoken command). In one embodiment, the split command itself is multimodal, in which the user provides a verbal "split" instruction while indicating via non-verbal input (e.g., a swipe across a touchscreen) where the screen is to be divided. In some examples, the "split" command can be used repeatedly to further subdivide the screen 2000.

Once the screen has been divided, the view may be populated by default applications or by applications currently executing on the device 100. In the example of FIG. 20, the first pane 2030 displays map data retrieved from a remote source, and the second pane 2040 displays a calendar interface. A control bar 2020, common to both panes, is also provided with an object display 2010, as in earlier examples, as well as Stop 2011, Execute 2012, and Clear 2013 buttons. The Stop and Execute buttons 2011, 2012 have functions similar to those described above; activating the Clear button 2013 clears content in the object display 2010.

The data populating the calendar interface may be retrieved from a local or remote data store. In the map pane, the user may change the view displayed using verbal or non-verbal commands (e.g., "street view", "satellite view"). Further, when a particular feature or location in the map is selected, that location may be linked in the accompanying second pane 2040. For instance, in response to a command, a hyperlink identifying the location may be inserted in a new or existing calendar event that is then displayed in the second pane 2040, such as the example event 2042. The hyperlink may then be retrieved at a later time for viewing in a different map view.

Mash-Ups

The above examples may also be implemented in mash-ups, which combine data and/or functionality from multiple sources resident either on the computing device 100, at remote locations, or both to produce a new service or result. Any of the object types described above—local or remote software objects, local or remote physical objects, services—may be referenced in a mash-up, and not all sources will necessarily be registered at the computing device 100. The interaction processing module 220 may therefore be configured to not only access local and registered objects via suitable APIs or other interfaces, but also to access a web service registry to locate additional services and/or to search for services over the Internet. The web service registry may permit third parties to register their services and specify objects and MetaObjects associated with therewith, including the same semantic descriptions of their services that are included in local objects and MetaObjects; thus, the web service registry represents a remote object repository accessible to the computing device. The web service registry may categorize services and objects according to the Universal Description Discovery and Integration framework to facilitate lookups by querying devices.

Figure 21:
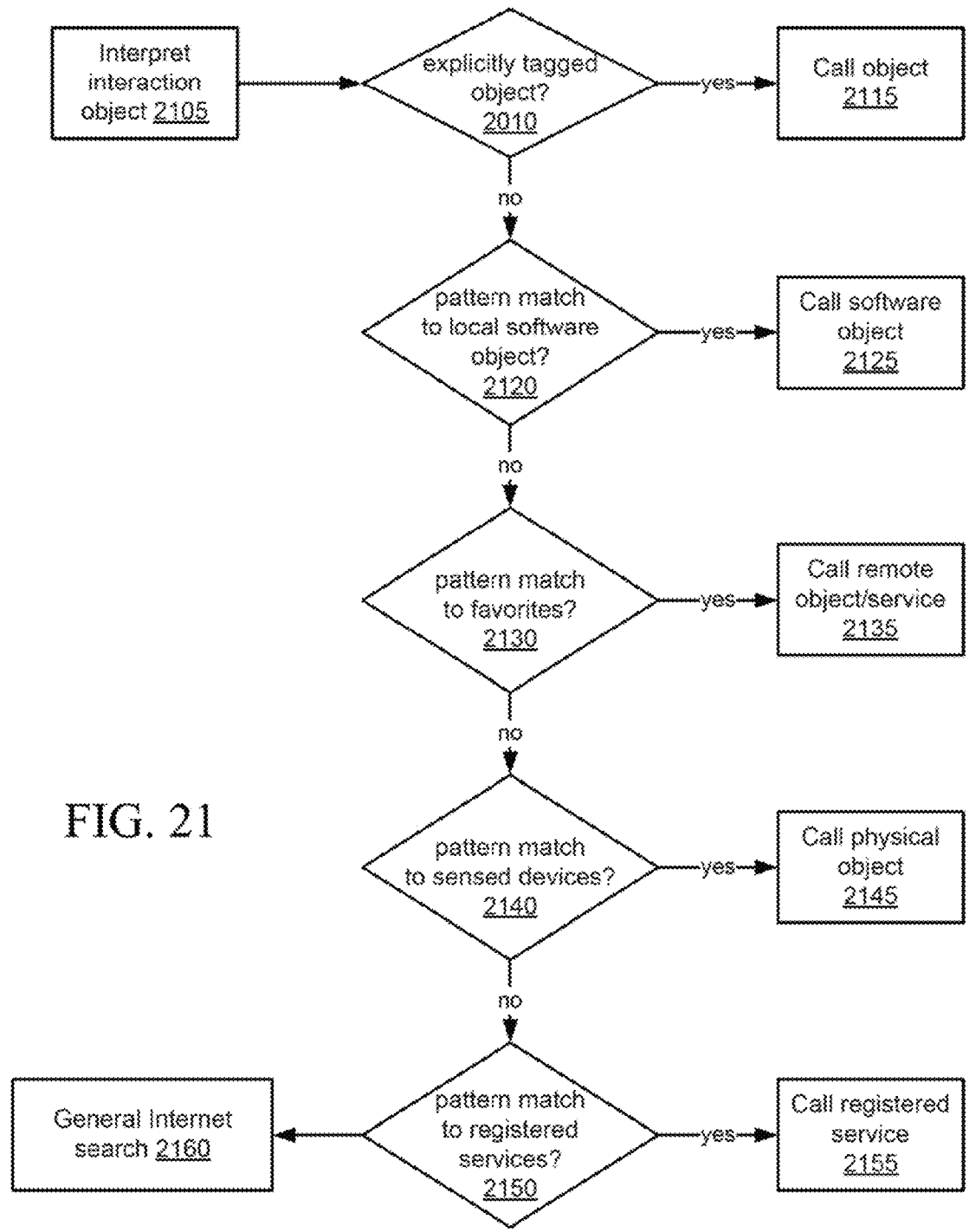
FIG. 21 is a flowchart illustrating a method of executing an interaction object with a mash-up function.

Many mash-up services currently available are, of course, predefined by the developer or publisher providing the mash-up service; however, the interaction object structure is flexible enough to permit users to generate requests or operations that, in effect, constitute a mash-up of several objects. FIG. 21 illustrates an example high-level process for processing an interaction object that includes references to multiple services, software objects, and/or physical objects. Some target objects referenced in the interaction object may have been explicitly tagged at the time the interaction object was constructed; however, other target objects in the interaction object may be present only as named entities in the verbal input and identified only as potential objects at the time the verbal input is tagged with parts of speech. Examples of named entities were provided above in the description of interaction with external entities. At 2105, an interaction object is interpreted, then execution begins. For each object that is the subject or target of an operation, a determination is first made at 2010 whether the object was explicitly defined (tagged) in the interaction object as described above. If so, then the object can be called as usual at 2115. Otherwise, the object is not yet identified. At 2120 a pattern match of the object is attempted against local software object definitions in the object repository 230. If there is a match, the software object is identified and called at 2125. Otherwise, the process moves on to 2030, where it is determined whether the object matches a previously defined and registered entity, such as a "favorite" service or remote object. If so, then the service or object is called at 2135. If there is no match, then it is determined at 2140 whether the object matches any physical objects or devices sensed or discovered by the computing device 100. If so, that physical object can be called at 2145; otherwise, it is determined whether the object matches a service registered in the aforementioned web service registry at 2150. If it is, then that registered service can be called at 2155; if multiple possible matches are found, the user may be prompted to select the desired service. Otherwise, the device 100 may invoke a general Internet search to try to locate a matching service at 2160 and present any hits to the user for selection. Once the service is selected, the computing device 100 may attempt to extract sufficient information from the multimodal input to construct a request for the service, but in some examples, the device 100 may prompt the user to provide parameters for the request.

Automated Classification of Input Content

The MetaObjects associated with multimodal or single-mode input can also be used to organize and categorize user input for later retrieval. For example, a note-taking or memo application executing on the device 100 can receive input from the user. This multimodal input is generally intended to be stored as a note or memorandum, rather than interpreted as an operation to be executed on an object; however, the application may be configured to create new objects of different types, or operate on objects; for instance, an input may constitute a note about an upcoming meeting at a certain time, which the device 100 could then store as a calendar event to be accessed by a calendar application.

When input is received, whether in single-mode or multimodal, and via any UI, any verbal components in the input are recognized and converted to text for matching against named entities, services, or objects, for example as described above in respect of mash-ups. Furthermore, any tagged objects from the input are identified. From this matching and identification, the associated MetaObjects can be identified, which provides an indication as to the type of content that was received in the input. From the example above, if the input content includes a direct or semantic match with calendar event attributes (e.g., the word "meeting" may be a synonym for a calendar event), the MetaObject for calendar events would be associated with the input, and the input itself could be stored by the note-taking application in association with a label or flag indicating that it is calendar or diary-related information. As another example, the user may explicitly identify an object (e.g., select the device from a list of discovered physical objects, select a software object presented on the device, or scan a physical product's UPC code or take an image of the product) and provide verbal input indicating that the object is a "favorite". The object identifier may then be added to a "favorites" list, or alternatively added to the object repository 230 as a newly registered service or object. The inputs may be stored by the note-taking application in their raw form (e.g., the recorded speech, or the captured handwriting), in addition to or in place of the recognized text. Other data elements captured by the device, such as images, video, and so on, may also be stored by the note-taking application. Stored data may then be subsequently searched or browsed via the note-taking application. Further, since the stored data is associated with MetaObjects that can include references to synonyms, semantic similarities, and phonetic codes for sound matching, the stored data may be indexed and searchable or browsable according to a variety of keywords beyond the keywords actually contained in the stored content.

It will be appreciated from all of the foregoing examples and features that the solutions described herein provide a flexible method, device and system for processing user input and associating the input with defined objects and MetaObjects in a manner that enhances the process of retrieving related data and executing input verbal instructions. For example, the tagging of objects identified by concurrent non-verbal input reduces the incidence of errors in speech recognition, since specific components of the input received overall were explicitly defined. Further, the concurrent tagging of objects permits the computing device 100 to begin construction of an interaction object for execution even before all input (i.e., speech input) is received and/or processed. Because objects may be tagged in advance of speech recognition, the MetaObject information associated with the tagged objects can be leveraged to speed up the processing and execution on user input overall, and to improve the accuracy of speech recognition by identifying likely matches between the object attributes and the detected speech patterns. Furthermore, the automatic association of MetaObject data with the tagged object, and its subsequent embedding into an interaction object, provides a type of rich contextual information surrounding the user's interaction with the computing device that was previously lacking in single-mode input.

Furthermore, with the proliferation of myriad types of user computing devices (smartphones, tablets, "phablets" (larger smartphones and smartphone/tablet hybrids), tablets, netbooks, laptops, and desktops with display panels of varying size, developers are burdened with the need to customize graphical user interfaces (including menus and icons, etc.) for each form factor in which their applications will be displayed, which includes designing, designing, developing, testing and supporting. However, by implementing the solutions described herein for concurrent verbal and non-verbal input, and specifically concurrent speech and gesture input, the burden on developers may be reduced since the need to customize a graphical user interface with menuing systems or other graphical user interface elements is reduced. This permits the developer to add new functionality or modify functionality on demand, without having to redesign the existing graphical user interface, thus improving scalability and productivity overall.

There is accordingly provided a method implemented at a computing device, the method comprising: receiving verbal input using a verbal input interface of the computing device; receiving, concurrently with at least part of the verbal input, at least one secondary input using a non-verbal input interface of the computing device; identifying one or more target objects from the at least one secondary input; recognizing text from the received verbal input; generating an interaction object, the interaction object comprising a natural language expression having references to the one or more identified target objects embedded within the recognized text; processing the interaction object to identify at least one operation to be executed on at least one of the one or more identified target objects; and executing the operation on the at least one of the one or more identified target objects.

In one aspect, the one or more target objects are identified prior to completion of the receipt of the verbal input.

In another aspect, the one or more target objects are identified prior to completion of recognition of the text from the received verbal input.

In still another aspect, generating the interaction object comprises identifying at least one attribute or at least one operation associated with each of the one or more identified target objects.

Still further, each of the one or more identified target objects may be associated with a metaobject defining the associated at least one attribute or at least one operation; processing the interaction object can comprise correlating at least a part of the recognized text with at least one identified attribute of at least one of the one or more identified target objects; and/or correlating can comprise identifying a match between the at least a part of the recognized text with the at least one identified attribute, or identifying a semantic similarity between the at least a part of the recognized text and the at least one identified attribute.

In yet another aspect, the method further comprises displaying a text or graphical representation of the interaction object for user confirmation prior to processing the interaction object. Further, the method can comprise receiving an indication of an error in the text recognized from the received verbal input; and providing a selection of one or more options to correct the indicated error, the one or more options being determined from at least one attribute associated with the one or more identified target objects.

In a further aspect, the method also comprises sending the interaction object to a further computing device for processing.

In a still further aspect, at least one secondary input comprises a touch-based input and/or a gestural input.

In yet a further aspect, the non-verbal input interface is selected from the group consisting of: a kinetic input interface; an inertial input interface; a perceptual input interface; a touch input interface; and a sensor input interface.

In another aspect, the verbal input comprises speech input.

Still further, when the secondary input comprises a gestural input associated with a plurality of actions, the method also comprises: determining, from the recognized text of the verbal input, that the gestural input is directed to a specific one of the plurality of actions; and executing the action.

And further, when the interaction object comprises a plurality of operations to be executed on the at least one of the one or more identified target objects, the method can further comprise: executing a first one of the plurality of operations on the at least one of the one or more identified target objects while buffering remaining ones of the plurality of operations; and sequentially executing the remaining ones of the plurality of operations after execution of the first one of the plurality of operations.

There is also provided a computing device, which can be of the types described above, adapted to implement the foregoing methods and variants. In one example, the computing device can comprise at least one verbal input interface; at least one non-verbal input interface; and have at least one processor in communication with the at least one verbal input interface and the at least one non-verbal input interface that is configured to enable or execute the steps of the foregoing methods and variants.

There is also provided a computer-readable medium, which may be physical or non-transitory, which bears code which, when executed by one or more processors of a computing device, causes the computing device to implement the steps of the forgoing methods and variants.

Other Examples and Embodiments

It should be understood that the various features, examples and embodiments described herein may be combined in any combination, even if not explicitly described above, and that while examples herein were drawn principally to touch and speech input, that other combinations of multimodal input may be used, such as a combination of speech and three-dimensional gesture input (e.g. kinetic or perceptual input). It should further be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at a computing device, the method comprising:
   receiving verbal input using a verbal input interface of the computing device;
   receiving, concurrently with at least part of the verbal input, at least one secondary input using a non-verbal input interface of the computing device, the non-verbal input interface being selected from the group of: a kinetic input interface, an inertial input interface, a perceptual input interface, a touch input interface, a graphical user interface, and a sensor input interface;
   identifying one or more target objects from the at least one secondary input;
   recognizing text from the received verbal input;
   generating an interaction object, the interaction object comprising a natural language expression having references to the one or more identified target objects identified from the at least one secondary input, the references being embedded within the recognized text, the generating of the interaction object comprising identifying at least one attribute associated with each of the one or more identified target objects or at least one operation associated with each of the one or more identified target objects;
   processing the interaction object to identify at least one operation to be executed on at least one of the one or more identified target objects; and
   executing the operation on the at least one of the one or more identified target objects.

2. The method of claim 1, wherein the one or more target objects are identified prior to completion of recognition of the text from the received verbal input.

3. The method of claim 1, wherein each of the one or more identified target objects is associated with a metaobject defining the associated at least one attribute or at least one operation.

4. The method of claim 1, wherein processing the interaction object comprises correlating at least a part of the recognized text with at least one identified attribute of at least one of the one or more identified target objects.

5. The method of claim 1, further comprising:
   displaying a text or graphical representation of the interaction object for user confirmation prior to processing the interaction object;
   receiving an indication of an error in the text recognized from the received verbal input; and
   providing a selection of one or more options to correct the indicated error, the one or more options being determined from at least one attribute associated with the one or more identified target objects.

6. The method of claim 1, further comprising sending the interaction object to a further computing device for processing.

7. The method of claim 1, wherein the at least one secondary input comprises a touch-based input.

8. The method of claim 1, wherein the verbal input comprises speech input.

9. The method of claim 1, wherein the verbal input comprises text input.

10. The method of claim 1, wherein the interaction object comprises a plurality of operations to be executed on the at least one of the one or more identified target objects, the method further comprising:
executing a first one of the plurality of operations on the at least one of the one or more identified target objects while buffering remaining ones of the plurality of operations; and
sequentially executing the remaining ones of the plurality of operations after execution of the first one of the plurality of operations.

11. The method of claim 1, further comprising:
storing the interaction object; and
subsequently, at the computing device or another computing device, processing the interaction object to identify the at least one operation to be executed on at least one of the one or more identified target objects, and executing the operation on the at least one of the one or more identified target objects.

12. The method of claim 1, wherein the computing device executes a plurality of applications, and the interaction object references one or more identified target objects from the plurality of applications.

13. The method of claim 12, wherein the plurality of applications are executing in a split screen mode on the computing device.

14. A computing device, comprising:
at least one verbal input interface;
at least one non-verbal input interface being selected from the group of: a kinetic input interface, an inertial input interface, a perceptual input interface, a touch input interface, a graphical user interface, and a sensor input interface;
at least one processor in communication with the at least one verbal input interface and the at least one non-verbal input interface, the at least one processor being configured to:
receive verbal input using the verbal input interface;
receive, concurrently with at least part of the verbal input, at least one secondary input using the at least one non-verbal input interface;
identify one or more target objects from the at least one secondary input;
recognize text from the received verbal input;
generate an interaction object, the interaction object comprising a natural language expression having references to the one or more identified target objects identified from the at least one secondary input, the references being embedded within the recognized text, the generation of the interaction object comprising identification of at least one attribute associated with each of the one or more identified target objects or at least one operation associated with each of the one or more identified target objects;
process the interaction object to identify at least one operation to be executed on at least one of the one or more identified target objects; and
execute the operation on the at least one of the one or more identified target objects.

15. The computing device of claim 14, wherein the one or more target objects are identified prior to completion of recognition of the text from the received verbal input.

16. The computing device of claim 14, wherein each of the one or more identified target objects is associated with a metaobject defining the associated at least one attribute or at least one operation.

17. The computing device of claim 14, wherein the at least one processor is configured to process the interaction object by correlating at least a part of the recognized text with at least one identified attribute of at least one of the one or more identified target objects.

18. The computing device of claim 14, wherein the at least one processor is further configured to:
display a text or graphical representation of the interaction object for user confirmation on a display of the computing device, prior to processing the interaction object;
receive an indication of an error in the text recognized from the received speech input; and
provide a selection of one or more options to correct the indicated error, the one or more options being determined from at least one attribute associated with the one or more identified target objects.

19. The computing device of claim 14, wherein the at least one processor is further configured to send the interaction object to a further computing device for processing.

20. The computing device of claim 14, wherein the at least one secondary input comprises a touch-based input.

21. The computing device of claim 14, wherein the verbal input comprises speech input.

22. The computing device of claim 14, wherein the verbal input comprises text input.

23. The computing device of claim 14, wherein the interaction object comprises a plurality of operations to be executed on the at least one of the one or more identified target objects, and the at least one processor is further configured to:
execute a first one of the plurality of operations on the at least one of the one or more identified target objects while buffering remaining ones of the plurality of operations; and
sequentially execute the remaining ones of the plurality of operations after execution of the first one of the plurality of operations.

24. The computing device of claim 14, wherein the at least one processor is further configured to:
store the interaction object; and
subsequently process the interaction object to identify the at least one operation to be executed on at least one of the one or more identified target objects, and execute the operation on the at least one of the one or more identified target objects.

25. The computing device of claim 14, wherein the at least one processor is further configured to execute a plurality of applications, and the interaction object references one or more identified target objects from the plurality of applications.

26. The computing device of claim 25, wherein the plurality of applications are executing in a split screen mode on the computing device.

27. A non-transitory computer-readable medium bearing code which, when executed by one or more processors of a computing device, causes the computing device to implement a method of:
receiving verbal input using a verbal input interface of the computing device;
receiving, concurrently with at least part of the verbal input, at least one secondary input using a non-verbal input interface of the computing device, the non-verbal input interface being selected from the group of: a kinetic input interface, an inertial input interface, a perceptual input interface, a touch input interface, a graphical user interface, and a sensor input interface;

identifying one or more target objects from the at least one secondary input;

recognizing text from the received verbal input;

generating an interaction object, the interaction object comprising a natural language expression having references to the one or more identified target objects identified from the at least one secondary input, the references being embedded within the recognized text, the generating of the interaction object comprising identifying at least one attribute associated with each of the one or more identified target objects or at least one operation associated with each of the one or more identified target objects;

processing the interaction object to identify at least one operation to be executed on at least one of the one or more identified target objects; and executing the operation on the at least one of the one or more identified target objects.

\* \* \* \* \*